(12) United States Patent
Kushniruk et al.

(10) Patent No.: US 11,722,433 B1
(45) Date of Patent: *Aug. 8, 2023

(54) ONLINE SOFTWARE PLATFORM (OSP) ACCESSING DIGITAL RULES UPDATED BASED ON CLIENT INPUTS

(71) Applicant: Avalara, Inc., Seattle, WA (US)

(72) Inventors: Marshal Kushniruk, Bainbridge Island, WA (US); Naveen Kumar Agrawal, Bellevue, WA (US); Gregory T. Kavounas, Bellevue, WA (US); Nikki Nash, Seattle, WA (US); Stefan Kim, Maple Valley, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,412

(22) Filed: Aug. 30, 2022

Related U.S. Application Data

(63) Continuation of application No. 17/185,732, filed on Feb. 25, 2021, now Pat. No. 11,463,375.

(60) Provisional application No. 62/985,716, filed on Mar. 5, 2020.

(51) Int. Cl.
*H04L 47/70* (2022.01)
*G06F 16/28* (2019.01)

(52) U.S. Cl.
CPC ............ *H04L 47/82* (2013.01); *G06F 16/285* (2019.01)

(58) Field of Classification Search
CPC ................................ H04L 47/82; G06F 16/285
See application file for complete search history.

(56) References Cited

U.S. PATENT DOCUMENTS

| 9,760,915 | B2 | 9/2017 | Pavlou et al. |
| 2007/0136158 | A1 | 6/2007 | Rawlings et al. |
| 2007/0136159 | A1 | 6/2007 | Rawlings et al. |
| 2009/0076965 | A1* | 3/2009 | Elson ................... H04L 63/1491 705/55 |
| 2014/0289386 | A1 | 9/2014 | Vatto et al. |
| 2016/0179874 | A1* | 6/2016 | Lynch .................. G06F 16/2365 707/690 |

OTHER PUBLICATIONS

Picham et al., "Cloud Forenscis: Technical Challenges, solutions, and comparitive analysis", Digital Investigation, vol. 13, Jun. 2015, pp. 38-57.*

(Continued)

*Primary Examiner* — Todd L Barker
(74) *Attorney, Agent, or Firm* — Jeremiah J. Baunach; VLP Law Group LLP

(57) ABSTRACT

An online software platform (OSP) classifies challenges to digital rules into buckets according to respective challenged digital rules that were applied to produce respective challenged resources. The OSP computes respective statistics for the buckets. Each bucket may have a corresponding statistic associated with the bucket based on a current total number of challenges that have been classified into that bucket. The OSP ranks the buckets according to the respective statistics of the buckets. The OSP may correct, based on the ranking of the buckets, the respective challenged stored digital rule of the selected bucket without yet correcting the respective challenged digital rule of at least one of the other buckets. This correction is stored and included in digital rules to be used to produce resources going forward.

18 Claims, 21 Drawing Sheets

(56) References Cited

OTHER PUBLICATIONS

Deseir, "Digital Transformation Challenges In Large and Complex Organizations", 2018.*

* cited by examiner

```
                                                                    ┌─ 1102 UI
                                                                    ↓
┌─────────────────────────────────────────────────────────────┐
│  ┌───────────────────────────────────────────────────────┐  │
│  │  SALES TAX RATE:                                      │  │
│  │                                                       │  │
│  │  Our value: 5.5%                                      │  │
│  │  Your value: ___0%_____                              │  │
│  │  Add explanation: ___tax holiday during sale_____   │  │
│  │  Add link, if any, as your source: ___www.state.dor.gov/news/2020/06___ │
│  │  Add screenshot of government website: ___            │  │
│  │                                                       │  │
│  │  For your recognition and award emails:               │  │
│  │  Your name: ___Alexandra Smith_____            │  │
│  │  Your work email address: ___Alexandra.Smith@xyz.com___ │
│  │  Your home email address: ___Alexandra.Smith@mypersonalemail.com___ │
│  │                                                       │  │
│  │  Return                                               │  │
│  └───────────────────────────────────────────────────────┘  │
└─────────────────────────────────────────────────────────────┘
  1191 SCREEN
```

FIGURE 11B

ONLINE SOFTWARE PLATFORM (OSP) ACCESSING DIGITAL RULES UPDATED BASED ON CLIENT INPUTS

TECHNICAL FIELD

The technical field relates to computer networks, and particularly to networked automated systems for an Online Software Platform (OSP) accessing and applying digital rules updated based on client inputs.

BRIEF SUMMARY

The present description gives instances of computer systems, devices and storage media that may store programs and methods. Embodiments of the system may enable an OSP to receive multiple challenges from multiple different clients in response to producing respective resources for the clients. In an example embodiment, the OSP classifies the challenges into buckets according to respective challenged digital rules that were applied to produce respective challenged resources. The OSP computes respective statistics for the buckets. Different numbers of buckets may be present in various different embodiments, for example, based on the number of different digital rules that are challenged. Each bucket may have a corresponding statistic associated with the bucket based on a current total number of challenges that have been classified into that bucket. The OSP ranks the buckets according to the statistic, for instance by at least causing a selected one of the buckets to be presented preferentially over other buckets according to the respective statistic of the selected bucket relative to the respective statistics of the other buckets.

The OSP may correct, based on the ranking the buckets, the respective challenged stored digital rule of the selected bucket without yet correcting the respective challenged digital rule of at least one of the other buckets. For example, this correction may be based on the challenges classified into the selected bucket. This correction is stored and included in digital rules to be used to produce resources going forward, for example by updating such digital rules. The OSP may also cause rewards to be electronically offered for receiving verified challenges that result in an update to a digital rule.

The OSP may then receive additional datasets from clients, with the additional datasets having respective dataset values. The OSP accesses the updated stored digital rules in response to receiving the additional datasets. The OSP identifies which of the digital rules are applicable to the additional datasets. The OSP then produces additional respective resources by applying the corrected digital rule and the yet-uncorrected challenged digital rules to the respective additional datasets.

The OSP causes notifications about aspects of the additional respective resources to be transmitted via a network to remote devices of the various clients that requested the resources to be produced and from which the respective datasets were received. In this manner, the digital rules which are most likely to need correcting, or that are in most urgent need of correcting, are corrected first based on the number of challenges to those digital rules as compared to other rules. Therefore, computing resources are prioritized for updating those particular rules, which improves computerized networks by more efficiently using such resources to increase the accuracy of the system.

Therefore, the systems and methods described herein for the OSP accessing digital rules updated based on client inputs improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 11B is a sample view of a User Interface (UI) that may be presented in after the user has entered input to the individual entry fields of FIG. 11A to including corrections and other information regarding the disputed sales tax aspect, according to embodiments of the present disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1A:
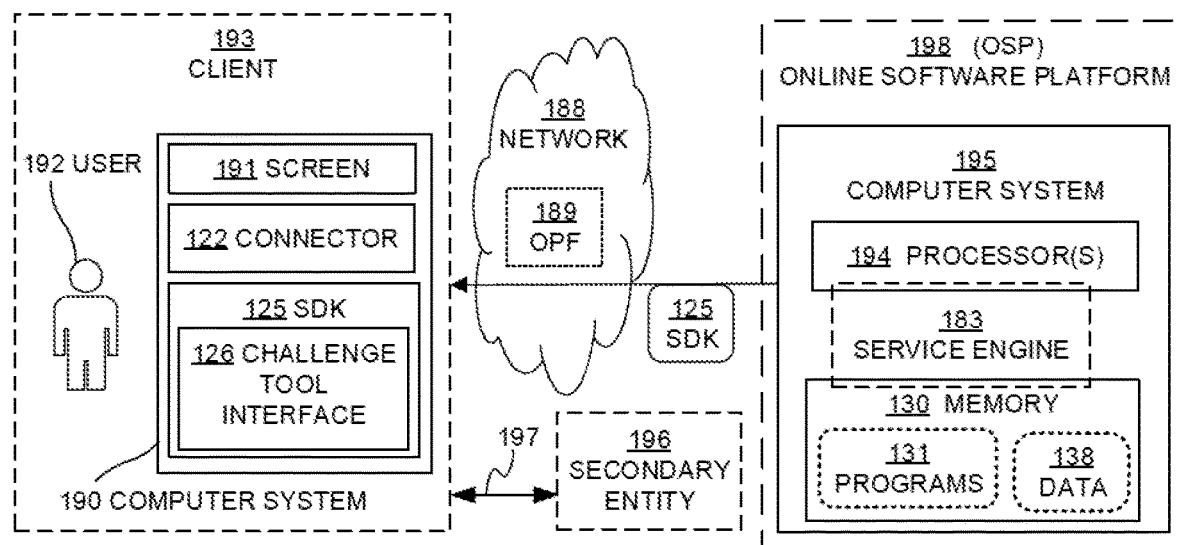
FIG. 1A is a diagram showing sample aspects of embodiments of the present disclosure involving a client receiving a software development kit (SDK) including a challenge tool interface, which is an improvement in automated computerized systems.

FIG. 1A is a diagram showing sample aspects of embodiments of the present disclosure involving a client receiving a software development kit (SDK) including a challenge tool interface 126, which is an improvement in automated computerized systems.

A sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. One or more of the components of the computer system 195 may also be present in client computer system 190 of client 193 for performing the operations and implementing the functionality of computer system 190 described herein.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: producing respective resources by applying digital rules to respective datasets received by clients, such as client 193; generation and delivery of a software development kit (SDK) 125 including a challenge tool interface 126 for the client 193 to send challenges to the OSP 198 disputing respective resources produced by the OSP for the client 193; causing a dispute opportunity including a promise of a reward for a challenge regarding the produced resource to be presented via the challenge tool interface 126, in conjunction with a produced resource, in a user interface (UI) displayed on the screen 191 of the computer system 190 of client 193; causing a reward to be transmitted, via the SDK 125, according to the promise based on a condition being met; correcting digital rules used to produce resources for the clients based on statistics regarding challenges received from clients, such as client 193, to resources that were produced by applying such rules; producing additional respective resources by applying the corrected digital rules; causing notifications to be transmitted to clients, such as client 193 via challenge tool interface 126, about aspects of the additional respective resources; and so on, including what is described in this document. Such services can be provided as a Software as a Service (SaaS).

The SDK 125 may be a collection of software development tools in one package installable by the client computer system 190. The SDK 125 may facilitate the creation of applications, such as the challenge tool interface 126 by having a compiler, debugger and a software framework. The SDK 125 may include libraries, documentation, code samples, processes, and guides that the client 193 can use and integrate with the connector 122 and other applications of the computer system 190 to implement the challenge tool interface 126 and facilitate the computer system 190 generating and sending challenges to the OSP 198 disputing resources produced by the OSP 198 for client 193. In various embodiments, the connector 122 may have been built by the client 193, the OSP 198 or another entity. The client 193 may use the SDK 125 for controlling the developing and adjusting, from the client-side, operations of the connector 122. In some embodiments, the SDK may have been built by the OSP 198.

A user 192 may be standalone. The user 192 may use a computer system 190 that has a screen 191, on which UIs may be shown. In embodiments, the user 192 and the computer system 190 are considered part of a client 193, which can be referred to also merely as entity. In such instances, the user 192 can be an agent of the client 193, and even within a physical site of the client 193, although that is not necessary. In embodiments, the computer system 190 or other device of the user 192 or the client 193 are client devices for the computer system 195.

The computer system 190 may access the computer system 195 via a communication network 188, such as the internet. In particular, the entities and associated systems of FIG. 1A may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, cable and/or satellite systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically. The computer system 190 and the computer system 195 may exchange requests and responses with each other. Such can be implemented with a number of architectures.

In one such architecture, a device remote to the service engine 183, such as computer system 190, may have a certain application, such as a challenge tool interface (CTI) 126 and an associated connector 122 that is integrated with, sits on top of, or otherwise works with that application. The connector 122 may be able to fetch from a remote device, such as the computer system 195, the details required for the service desired from the OSP 198. The computer system 190 may receive, via network 188, an SDK 125 from the OSP 198 that includes the CTI 126 and/or the connector 122. The OSP 198 may prepare and send the CTI 126 as part of the SDK 125 automatically or in response to a request from the client computer system 190. In requesting services from the OSP 198, the client computer system 190 may form an object or payload, and then send or push a request that carries the payload to the service engine 183 via a service call, such as, for example, an application programming interface (API) call. The service engine 183 may receive the request with the payload. The service engine 183 may then apply digital rules to the payload to determine a requested resource, form a payload that is an aspect of the resource and then push, send, or otherwise cause to be transmitted a response that carries the payload to the connector 122. The connector reads the response, and forwards the payload to the certain application, such as the CTI 126.

In some embodiments, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. In some embodiments, this architecture enables the client 193 to directly consume a REST API from their particular application (e.g., CTI 126), without using a connector 122. The particular application of the remote device may be able to fetch internally from the remote device the details required for the service desired from the OSP 198, and thus send or push the request to the REST API. In turn, the REST API talks in background to the service engine 183. Again, the service engine 183 determines the requested resource and sends an aspect of it back to the REST API. In turn, the REST API sends the response that has the payload to the particular application (e.g., CTI 126).

As one example service the OSP 198 may provide to the client 193, the service engine 198 of the OSP may use digital rules to estimate resources for the client 193. However, the client 193 may disagree with the produced resource, or an aspect thereof, such as a particular resource value. The CTI 126 implements a UI that permits clients, such as client 193, to enter comments about the digital rules, or aspects thereof, used by the OSP 198 to produce such resources, and specifically how well these digital rules meet conditions by third parties. In some instances, these comments are about errors in aspects of the resources produced and/or the digital rules used by the OSP 198 to produce such resources.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, any devices of the OPF 189 can be considered to be remote devices, from the perspective of the computer system 195 and/or client computer system 190.

In some instances, the user 192 or the client 193 may have instances of relationships with secondary entities. Only one such secondary entity 196 is shown. However, additional secondary entities may be present in various other embodiments. In this example, the client 193 has a relationship instance 197 with the secondary entity 196. In some embodiments, the secondary entity may also communicate with the client 193 via network 188.

In some instances, the user 192, the client 193 and/or one or more intermediary entities (not shown) may have data about one or more secondary entities, such as secondary entity 196, for example via relationship instances of the user 192 or client 193 with the secondary entity 196. The client 193 and/or the secondary entity 196 may be referred to as simply entities. One of these entities may have one or more attributes. Such an attribute of such an entity may be any one of its name, type of entity, a physical or geographical location such as an address, a contact information, an affiliation, a characterization of another entity, a characterization by another entity, an association or relationship with another entity (general or specific instances), an asset of the entity, a declaration by or on behalf of the entity, and so on.

Figure 1B:
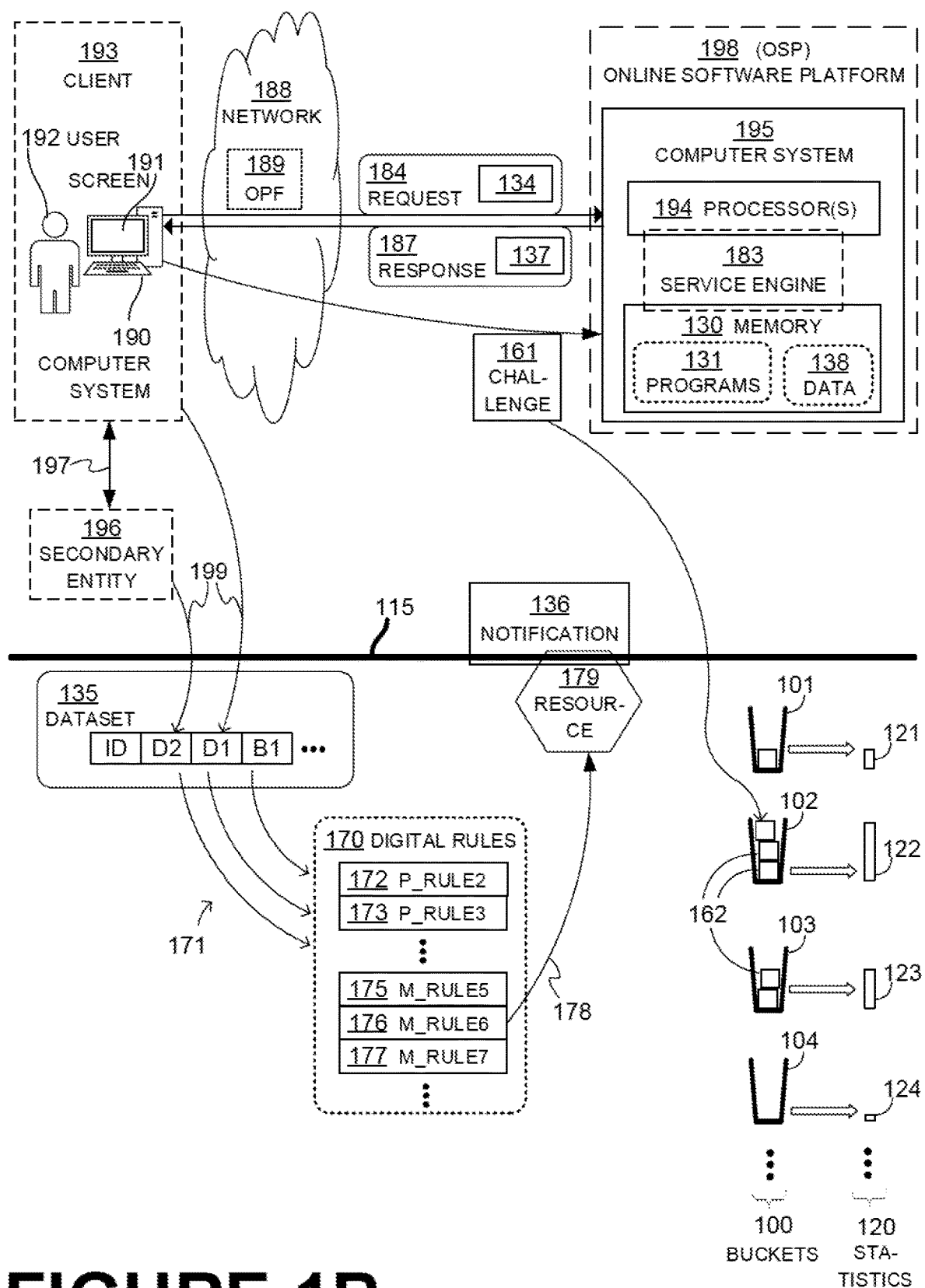
FIG. 1B is a diagram showing sample aspects of embodiments of the present disclosure involving receiving challenges from the client of FIG. 1A disputing resources produced by the online software platform (OSP) of FIG. 1A based on digital rules, which is an improvement in automated computerized systems.

FIG. 1B is a diagram showing sample aspects of embodiments of the present disclosure involving receiving challenges 161 from the client 193 disputing resources produced by the OSP 193 based on digital rules 170, which is an improvement in automated computerized systems.

A thick line 115 separates this diagram, although not completely or rigorously, into a top portion and a bottom portion. Above the line 115 the emphasis is mostly on entities, components, their relationships, and their interactions, while below the line 115 emphasis is mostly processing of data that takes place often within one or more of the components above the line 115.

Above the line 115, the sample computer system 195, network 188, client computer system 190 and secondary entity 196 according to embodiments is shown. In embodiments, the computer system 190 generates one or more datasets. A sample generated dataset 135 is shown below the line 115. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. (It should be noted that the arrows 199 describe a correspondence, but not the journey of data in becoming the dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of an identity or other characteristic of the client 193 and/or the secondary entity 196. The dataset 135 may further have additional such values, as indicated by the horizontal dot-dot-dot to the right of the dataset 135. In some embodiments, the dataset 135 has values that characterize attributes of each of the client 193 and the secondary entity 196, but that is not required.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE6 176 is thus identified, which is indicated also by the beginning of an arrow 178 that is described in more detail later in this document. Identifying may be performed in a number of ways, and depending on how the digital main rules are implemented. An example is now described.

Figure 2:
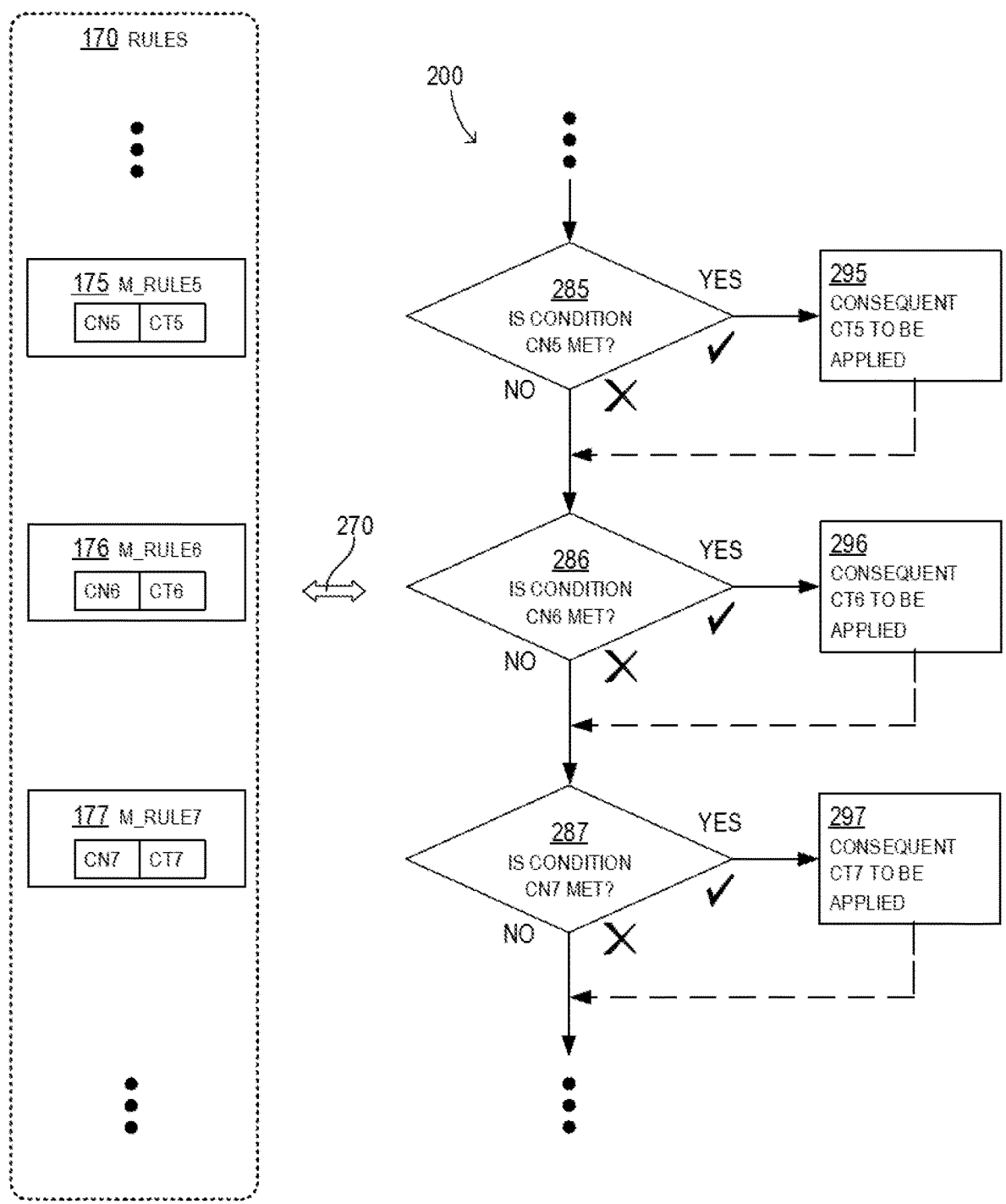
FIG. 2 is a diagram that repeats some of the digital main digital rules of FIG. 1B in more detail, and juxtaposes them with a flowchart portion for a sample method of how it may be recognized that conditions of a certain digital main rule can be met for its consequent to be applied, all according to embodiments of the present disclosure.

Referring now also to FIG. 2, some of the digital main rules of digital rules 170 are repeated from FIG. 1B in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 2, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 27, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1B, the certain M_RULE6 176 was thus identified. With reference to FIG. 2, the identification may have happened at operation 286 of the flowchart portion 200, at which time it was recognized that condition CN6 was met by a value of the dataset 135. This made: the condition CN6 be the certain condition, the digital main rule M_RULE6 176 be the certain digital main rule, and the consequent CT6 be the certain consequent of the certain digital main rule M_RULE6 176. And the certain consequent CT6 is associated with the certain condition CN6, since both are included by the certain digital main rule 176. Therefore, according to operation 296, consequent CT6 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 286 may give the answer YES such that consequent CT6 is to be applied, and operation 287 may also give the answer YES such that consequent CT7 is to be applied.

Where more than one of the digital main rules are found that could be applied, there are additional possibilities. For instance, the computer system 195 of FIG. 1B may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

In embodiments, a resource may be produced for the dataset, by the computer system 195 applying the certain consequent of the certain digital main rule. The resource can be a computational result, a document, an item of value, a representation of an item of value, etc., made, created or prepared for the user 192, the client 193 and/or the secondary entity 196, etc., on the basis of the attribute. As such, in some embodiments, the resource is produced by a determination and/or a computation. In the example of FIG. 1B, a resource 179 is produced for the dataset 135, by the computer system 195 applying the certain M_RULE6 176, and in particular its certain consequent CT6, as indicated by the arrow 178. In fact, sometimes applying the consequent is more simply stated as "applying the rule".

The resource may be produced in a number of ways. For example, the certain consequent can be applied to one of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1B, the computer system 195 may recognize that an additional condition of an additional one of the accessed digital main rules 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification can be caused to be transmitted, e.g., via the network 188, by the computer system. The notification can be about an aspect of the resource. In the example of FIG. 1B, a notification 136 can be caused to be transmitted by the computer system 195, for example as an answer or other response to the received dataset 135. The notification 136 can be about an aspect of the produced resource 179. In particular, the notification 136 may inform about the aspect of the resource 179, namely that it has been determined, where it can be found, what it is, or at least a portion or a statistic of its content, a rounded version of it, and so on. Of course, the planning should be that the recipient of the notification 136 understands what it is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1B. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity value (ID) and/or one or more values of the dataset 135. This will help the recipient correlate the response 187 to the request 184, and therefore match the received aspect of the resource 179 as the answer or other response to the appropriate dataset.

In an example embodiment, there may be a plurality of relationship instances between the client 193 and one or more secondary entities, such as secondary entity 196. In some embodiments, such relationship instances are between the client 193 and one or more secondary entities, such as secondary entity 196, via one or more intermediary entities (not shown). Each relationship instance may be associated with one or more respective domains of a plurality of domains. In various embodiments, a domain may be a region defined by a boundary as discussed above or may be an entity representing or otherwise associated with the region. For example, the region could be geographic, within the space of a city, a county, a state, a country, a continent or the earth.

For example, in one embodiment, client 193 may have a relationship instance with secondary entity 196 and that particular relationship instance may be associated with one or more domains. The association of the relationship instance with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance and/or one or more characteristics of the relationship instance may be defined or represented by values of dataset 135.

In some embodiments, for each relationship instance of the plurality of relationship instances represented by dataset 135, the OSP 198 electronically identifies a rate to calculate an amount of resource due to one or more respective domains associated with the relationship instance based on particular attributes of the dataset 135 and the one or more respective domains. For example, the client 193 may send request 184 to the computer system 195 of OSP 198 for services that include producing resources based on the dataset 135. The request 184 may include the existence or identification of the relationship instance and/or one or more characteristics of the relationship instance as part of payload 134. The service engine 183 may then apply digital rules 170 to the relationship instance and/or one or more characteristics of the relationship instance to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain, then rule M_RULE5 175 is to be applied. The service engine 183 may determine that the condition is met due to one or more values of dataset 135 indicating the particular relationship instance and that the particular relationship instance is associated with the particular domain. Thus, as a consequent of precedence rule P_RULE2 172, the service engine 183 applies rule M_RULE5 175. Rule M_RULE5 175 may include a condition CN5 that indicates if a particular source of the resource received for that relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that a particular attribute of the dataset is associated with a particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on one or more attributes of the dataset 135, and also calculates an amount of resources due to at least one respective domain associated with the relationship instance based on the identified rate. In some embodiments, this calculated amount of resources due may be included by the service engine 183 as part of the resulting produced resource 179 and/or notification 136. The service engine 183 may then form a payload 137 that is an aspect of the resource 179, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains. In various embodiments, the notification 136 may comprise the response 187, or the response 187 may be included in the notification 136.

In the present embodiment, the OSP 198 enables clients, such as client 193, to enter comments about the resource 179 and/or digital rules 170 used to produce the resource 179, and specifically how well these digital rules 170 meet conditions by third parties. In some instances, these comments are responsive to notifications, such as the notification 136 and are about errors in the resource 179 indicated by the notification 136. Such comments may be communicated to the OSP 198 over network 188 via the challenge interface tool 126 of FIG. 1A. The comments may include or comprise a challenge 161 to the resource 179. In various embodiments, the challenge 161 may be a challenge disputing the accuracy or correctness of: the resource 179; one or more aspects of the resource; how the resource 179 was produced; one or more of the digital rules 170 used by the OSP 198 to produce the resource 179; one or more aspects of one or more of the digital rules 170 used by the OSP 198 to produce the resource 179 and/or how one or more of the digital rules 170 was selected or applied by the OSP 198 to produce the resource 179. For example, the challenge 161 may dispute the accuracy or correctness of one or more of: resource 179; M_RULE6 176 that was applied to the dataset 135 to produce resource 179; how M_RULE6 176 was identified; how M_RULE6 176 was applied; condition CN6; whether condition CN6 was met; digital precedence rule P_RULE2 173 that may decide whether rule M_RULE5 176 is to be applied when a certain condition is met; consequent CT6; the application of consequent CT6; and other conditions or consequents associated with M_RULE6 176 and/or P_RULE2 172. In an example embodiment, the OSP 198 enables the challenge by presenting, such as via the challenge tool interface 126, at least one of the digital rules 170 that was applied to produce the resource 179. The challenge 161 may also include a proposed correction the challenged digital rule of digital rules 170.

The OSP 198 may receive multiple challenges, such as challenge 161 and other challenges 162, from multiple different clients, such as client 193, in response to producing respective resources, such as resource 179, for the clients. In the present embodiment, the service engine 183 of the OSP 198 classifies the challenges into buckets 100 according to respective challenged rules of digital rules 170 that were applied to produce the respective ones of the challenged resources. The service engine 183 computes respective statistics 120 for the buckets 100. For example, challenges to M_RULE5 175 may be classified into bucket 101, challenges to M_RULE6 176 (such as challenge 161) may be classified into bucket 102, challenges to P_RULE2 172 may be classified into bucket 103. In some embodiments, the devices to which the notifications, such as notification 136, are sent are different than the devices from which the challenges, such as challenge 161, are received. In the present example, the service engine 183 has computed statistic 121 based on a total of one challenge classified into bucket 101, statistic 122 based on a total of three challenges classified into bucket 102, statistic 123 based on a total of two challenges classified into bucket 103, and statistic 124 based on zero challenges classified into bucket 104. Different numbers of buckets 100 may be present in various different embodiments, for example, based on the number of different digital rules 170. Each bucket may have a corresponding statistic associated with the bucket based on a current total number of challenges that have been classified into that bucket.

The service engine 183 ranks the buckets 100 by at least causing a selected one of the buckets to be presented preferentially over others of the buckets 100 according to the respective statistic of the selected bucket relative to the respective statistics of the other buckets. Accordingly, in the present example, the service engine 183 selects bucket 102 based on ranking bucket 102 higher than bucket 101, bucket 103 and bucket 104 (i.e., preferentially presenting bucket 102 over bucket 101, bucket 103 and bucket 104) because bucket 102 has had the most challenges 162 classified into it as indicated by statistic 122.

The service engine 183 may correct, based on the ranking the buckets 100, the respective challenged stored digital rule of the selected bucket 102 without yet correcting the respective challenged digital rule of at least one of the other buckets. For example, this correction may be based on the challenges, including challenge 161, classified into the selected bucket 102. Thus, in the present example, the service engine 183 corrects M_RULE5 176 of selected bucket 102 without yet correcting the respective challenged digital rule M_RULE5 175 of bucket 101 and challenged M_RULE7 177 of bucket 103. This correction is stored and included in digital rules 170 as an update to M_RULE5 176.

The service engine 183 may then receive additional datasets (not shown) from the client 193 and/or other clients, with the additional datasets having respective dataset values. The additional datasets may be datasets such as those described with respect to example dataset 135. The service engine 183 accesses the stored digital rules 170 in response to receiving the additional datasets. Similar to the process described above, the service engine 183 identifies which of digital rules 170 are applicable to the additional datasets. In the present example, the service engine 183 identifies corrected digital rule M_RULE5 176 and the yet-uncorrected challenged digital rules M_RULE5 175 and M_RULE7 177 for respective ones of the additional datasets responsive to at least one of the dataset values of the additional respective datasets. The service engine 183 then produces additional respective resources by applying the corrected digital rule M_RULE5 176 and the yet-uncorrected challenged digital rules M_RULE5 175 and M_RULE7 177 to the respective additional datasets. The service engine 183 causes notifications about aspects of the additional respective resources, similar to notification 136, to be transmitted via network 188 to remote devices of the various clients that requested the resources to be produced and from which the respective datasets were received. In this manner, the digital rules which are most likely to need correcting, or that are in most urgent need of correcting, are corrected first based on the number of challenges to those digital rules as compared to other rules. Therefore, computing resources are prioritized for updating those particular rules, which improves computerized networks by more efficiently using such resources to increase the accuracy of the system.

Figure 3:
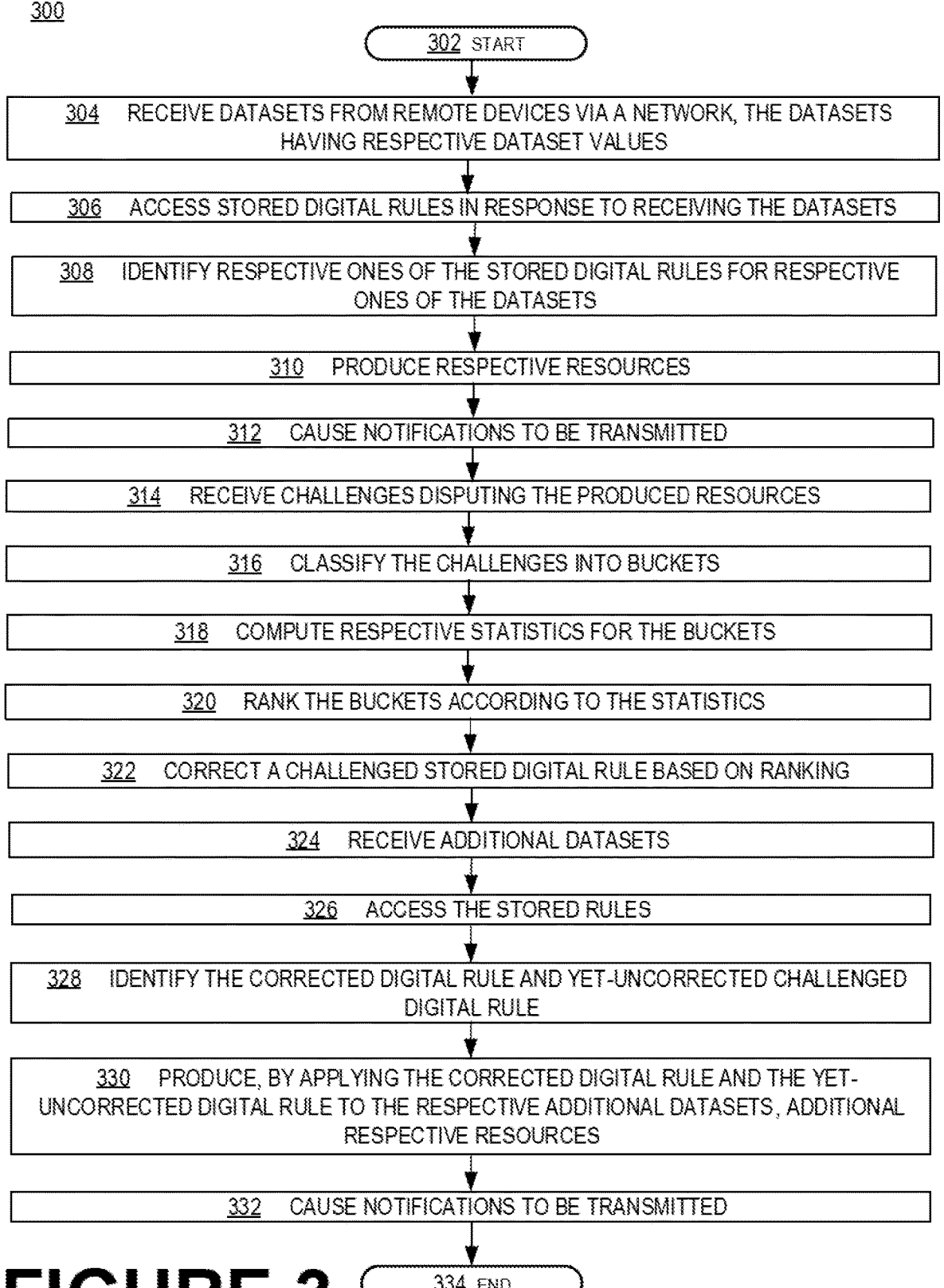
FIG. 3 is a flowchart for illustrating a sample method for producing additional resources based on corrected digital rules that is an improvement in automated computerized systems, according to embodiments of the present disclosure.

FIG. 3 is a flowchart for illustrating a sample method 300 for producing additional resources based on corrected digital rules that is an improvement in automated computerized systems, according to embodiments of the present disclosure.

Figure 5:
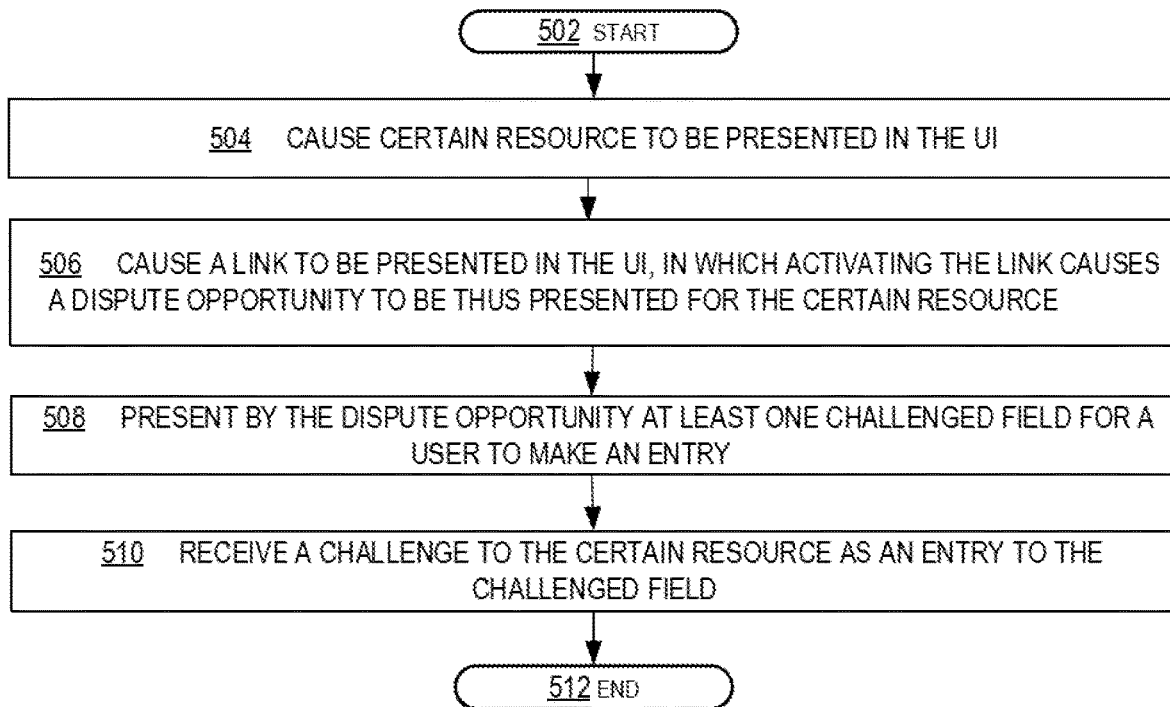
FIG. 5 is a flowchart for illustrating a sample method for presenting dispute opportunities and receiving challenges via a user interface, according to embodiments of the present disclosure.
Figure 6:
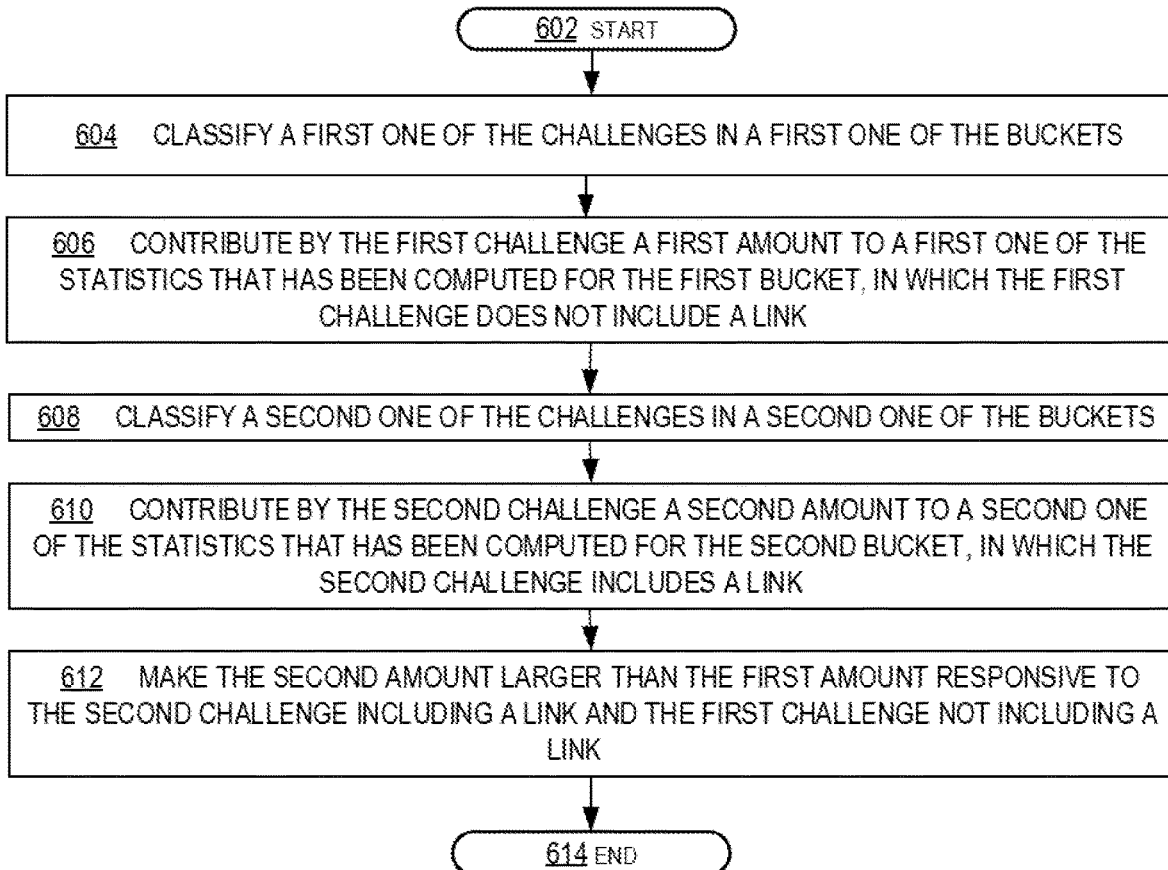
FIG. 6 is a flowchart for illustrating a sample method for contributing to statistics of buckets into which challenges disputing resources have been classified, according to embodiments of the present disclosure.
Figure 7:
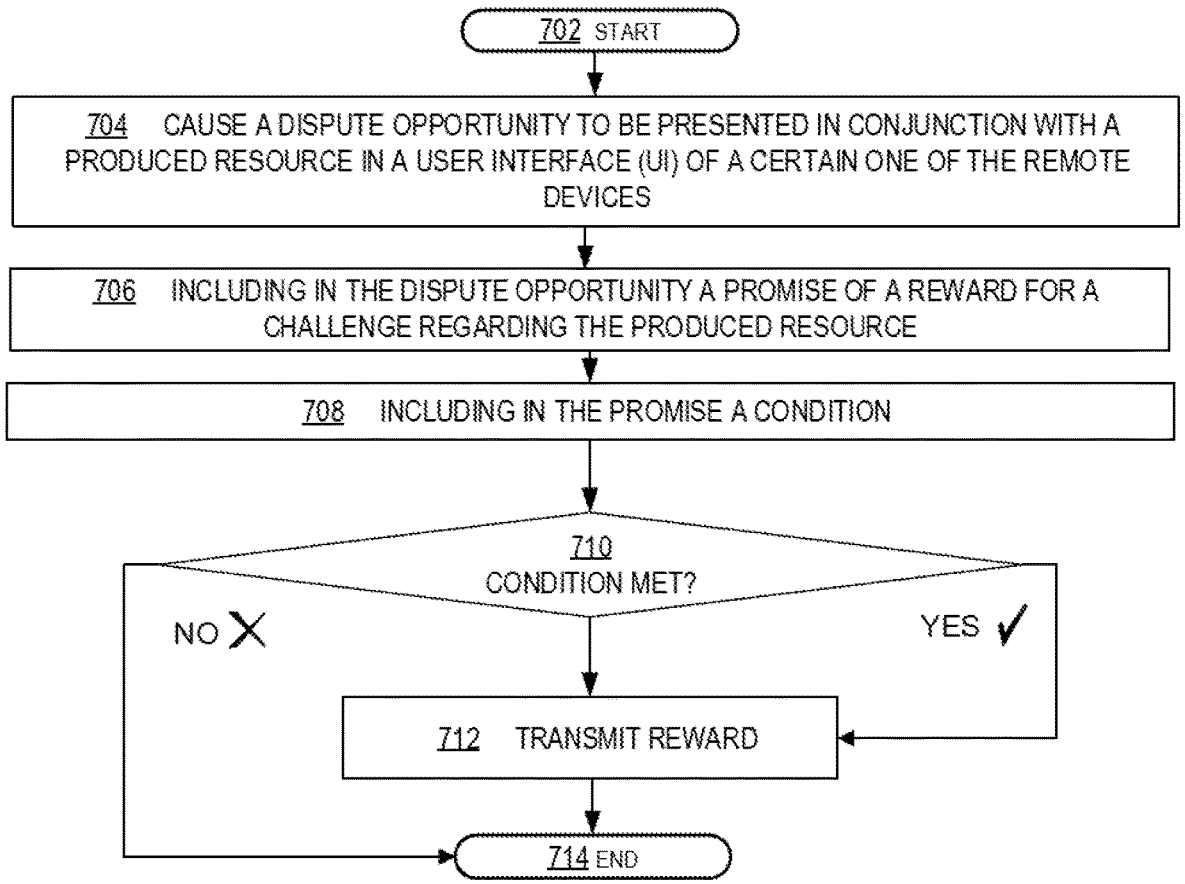
FIG. 7 is a flowchart for illustrating a sample method for transmitting rewards for challenges regarding produced resources, according to embodiments of the present disclosure.

Although, in the present example, the operations and methods described with reference to the flowcharts illustrated in FIGS. 3, 5 and 7 are described as being performed by the OSP 198, in various embodiments, one or more of the operations and methods described with reference to the flowcharts illustrated in FIGS. 6-8 may be performed by the computer system client computer system 190 of client 193.

The method 300 starts at 302.

At 304 the OSP 198 receives datasets from first remote devices via a network, the datasets having respective dataset values.

At 306, the OSP 198 accesses stored digital rules in response to receiving the datasets.

At 308, the OSP 198 identifies respective ones of the stored digital rules for respective ones of the datasets responsive to at least one of the dataset values of the respective datasets.

At 310, the OSP 198 produces, by applying the respective digital rules to the respective datasets, respective resources.

At 312, the OSP 198 causes notifications to be transmitted via a network to the first remote devices, the notifications being about aspects of the resources.

At 314, the OSP 198 receives from second remote devices via a network, challenges responsive to at least some of the notifications, the challenges disputing challenged ones of the resources.

At 316, the OSP 198 classifies the challenges into buckets according to respective challenged ones of the digital rules that were applied to produce the respective ones of the challenged resources.

At 318, the OSP 198 computes respective statistics for the buckets.

At 320, the OSP 198 ranks the buckets by at least causing a selected one of the buckets to be presented preferentially over others of the buckets according to the respective statistic of the selected bucket relative to the respective statistics of the other buckets.

At 322, the OSP 198 corrects, based on the ranking the buckets, the respective challenged stored digital rule of the selected bucket without yet correcting the respective challenged digital rule of at least one of the other buckets.

At 324, the OSP 198 receives additional datasets from the first remote devices via a network, the additional datasets having respective dataset values.

At 326, the OSP 198 accesses the stored digital rules in response to receiving the additional datasets.

At 328, the OSP 198 identifies the corrected digital rule and the yet-uncorrected challenged digital rule for respective ones of the additional datasets responsive to at least one of the dataset values of the additional respective datasets.

At 330, the OSP 198 produces, by applying the corrected digital rule and the yet-uncorrected digital rule to the respective additional datasets, additional respective resources.

At 332, the OSP 198 causes notifications to be transmitted via a network to the first remote devices, the notifications being about aspects of the additional respective resources.

The method 300 ends at 334.

Figure 4:
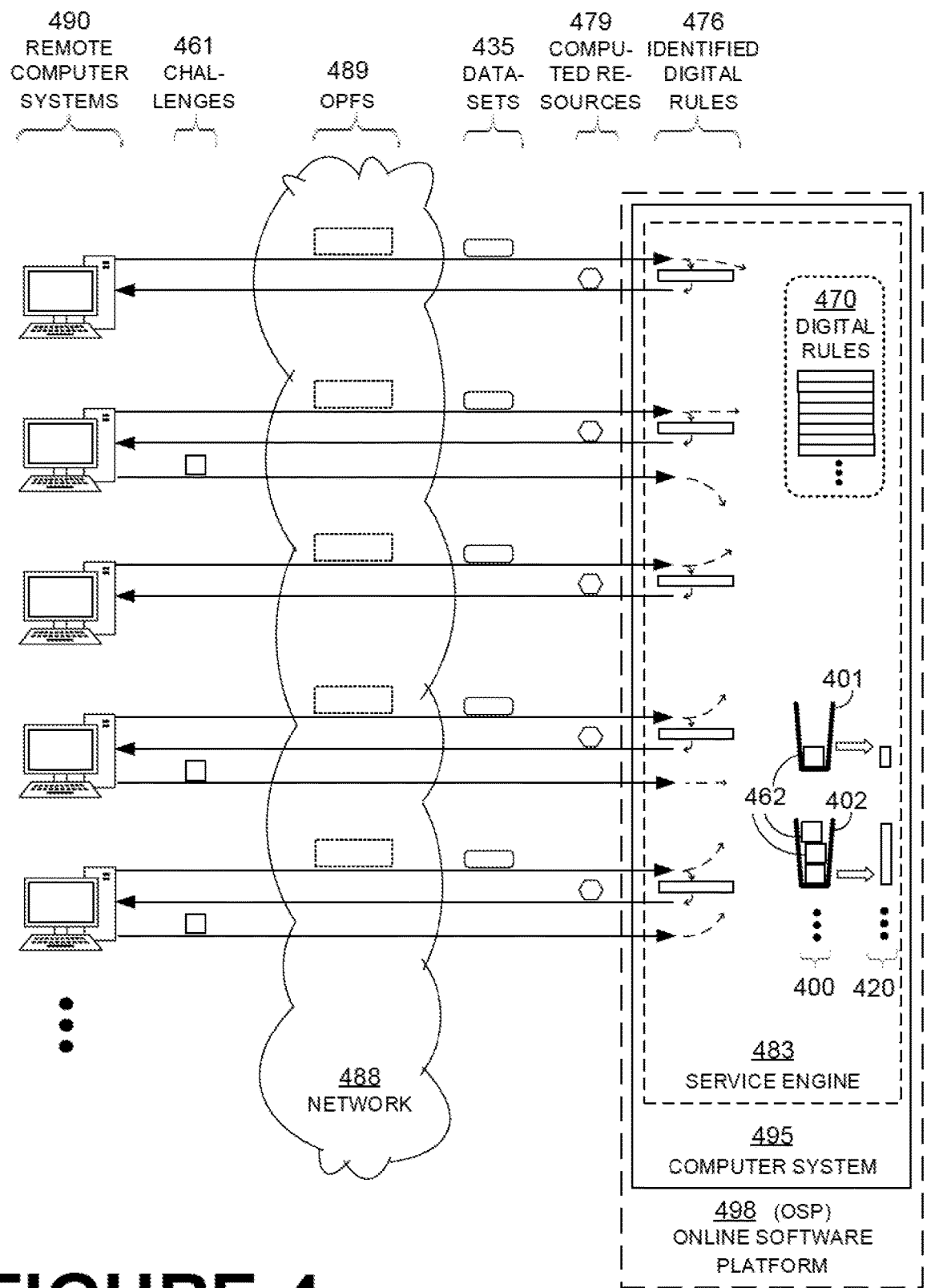
FIG. 4 is a diagram showing sample aspects of embodiments of the present disclosure involving classifying the challenges into buckets according to digital rules that were challenged by multiple different remote devices, which is an improvement in automated computerized systems.

FIG. 4 is a diagram showing sample aspects of embodiments of the present disclosure involving classifying challenges 461 into buckets 400 according to which ones of digital rules 470 were challenged by the challenges 461, which have been received from only some and not necessarily all of multiple different remote devices 490, which is an improvement in automated computerized systems.

A plurality of remote devices, such as remote computer systems 490, may send datasets 435 over network 488 to the service engine 483 of the computer system 495 of the OSP 498 requesting that the OSP 498 produce resources 479 based on applying digital rules 470 to the datasets 435. Each of the remote computer systems 490 may be of different clients of OSP 498 and are examples of computer system 190 of client 193 of FIG. 1B. Also, the service engine 483, the computer system 495, the OSP 498, the resources 479, the digital rules 470, the datasets 435, the OPFS 489 and the network 488 may be examples of the service engine 183, the computer system 195, the OSP 198, the resources 179, the digital rules 170, the datasets 135, the OPFS 189 and the network 188 of FIG. 1B, respectively.

In the present example, the service engine 483 has identified particular digital rules of digital rules 470 based on the datasets 435 and has produced resources 479 as a result of applying those particular digital rules to the datasets 435. The OSP 498 transmits the resources 479 to the remote computer systems 490 and in response receives challenges to those resources and/or the particular digital rules used to produce those resources from some of the remote computer systems 490.

The service engine 483 of the OSP 498 classifies the challenges into buckets 400 according to respective challenged rules of digital rules 470 that were applied to produce the challenged resources. In the present example, the service engine 483 has classified received challenges 462 into bucket 401 and bucket 402. Bucket 401 is for challenges made to one particular digital rule and bucket 402 is for challenges made to another particular digital rule. The service engine 183 computes respective statistics 420 for the buckets 400, for example, based on the number of challenges classified into each of bucket 401 and bucket 402. In some embodiments, the statistic for each bucket may be the number of challenges classified into that bucket. Additional buckets may be present in various embodiments, for example, according to the number of different challenged digital rules of digital rules 470.

FIG. 5 is a flowchart for illustrating a sample method 500 for presenting dispute opportunities and receiving challenges 461 via a user interface, according to embodiments of the present disclosure.

The method 500 starts at 502.

At 504, the service engine 483 causes a resource to be presented in a UI of a certain one of a plurality of remote devices, such as a certain one of remote computer systems 490.

At 506, the service engine 483 causes a link to be presented in the UI in conjunction with the resource, in which activating the link causes a dispute opportunity to be thus presented for a certain resource, such as for a certain one of the resources 479.

At 508, the dispute opportunity presents at least one challenged field for a user to make an entry.

At 510, the service engine 483 receives a challenge, such as one of the challenges 461, to a challenged resource as an entry to the challenged field.

The method 500 ends at 512.

FIG. 6 is a flowchart for illustrating a sample method 600 for contributing to statistics of buckets 400 into which challenges 461 disputing resources 479 have been classified, according to embodiments of the present disclosure.

The method 600 starts at 602.

At 604, the service engine 483 classifies a first one of the challenges in a first one of the buckets 400, such as bucket 401.

At 606, the service engine 483 contributes a first amount to a first one of the statistics 420 that has been computed for the first bucket in which the first challenge does not include a link.

At 608, the service engine 483 classifies a second one of the challenges in a second one of the buckets 400, such as bucket 402.

At 610, the service engine 483 contributes a second amount to a second one of the statistics 420 that has been computed for the second bucket, in which the second challenge includes a link. For example, the link may be a network link to further information regarding the second one of the challenge.

At 612, the service engine 483 makes the second amount larger than the first amount responsive to the second challenge including a link and the first challenge not including a link. For example, a link included with the challenge may indicate that the challenge is to be given more weight or importance as it is supported by further information at the link, and thus the statistic of the bucket into which the challenge was classified may receive a higher statistic and thus a higher resulting rank compared to other buckets into which other challenges without links are classified.

The method 600 ends at 614.

FIG. 7 is a flowchart for illustrating a sample method 700 for transmitting rewards for challenges regarding produced resources, according to embodiments of the present disclosure.

The method 700 starts at 702.

At 704, the service engine 483 causes a dispute opportunity to be presented in conjunction with a produced resource in a UI of a certain one of the remote devices, such as a certain one of remote computer systems 490.

At 706, the service engine 483 includes in the dispute opportunity a promise of a reward for a challenge regarding the produced resource.

At 708, the service engine 483 includes in the promise a condition that must be met for the reward to be transmitted to the certain one of the remote devices.

At 710, the service engine 483, after receiving the challenge regarding the produced resource, determines whether the condition has been met.

At 812, if it was determined that the condition has been met, then the reward is transmitted, else the reward is not transmitted. For example, the reward may be transmitted to the certain one of the remote devices to which the dispute opportunity was presented and from which the challenge was received.

The method ends at 714.

Figure 8:
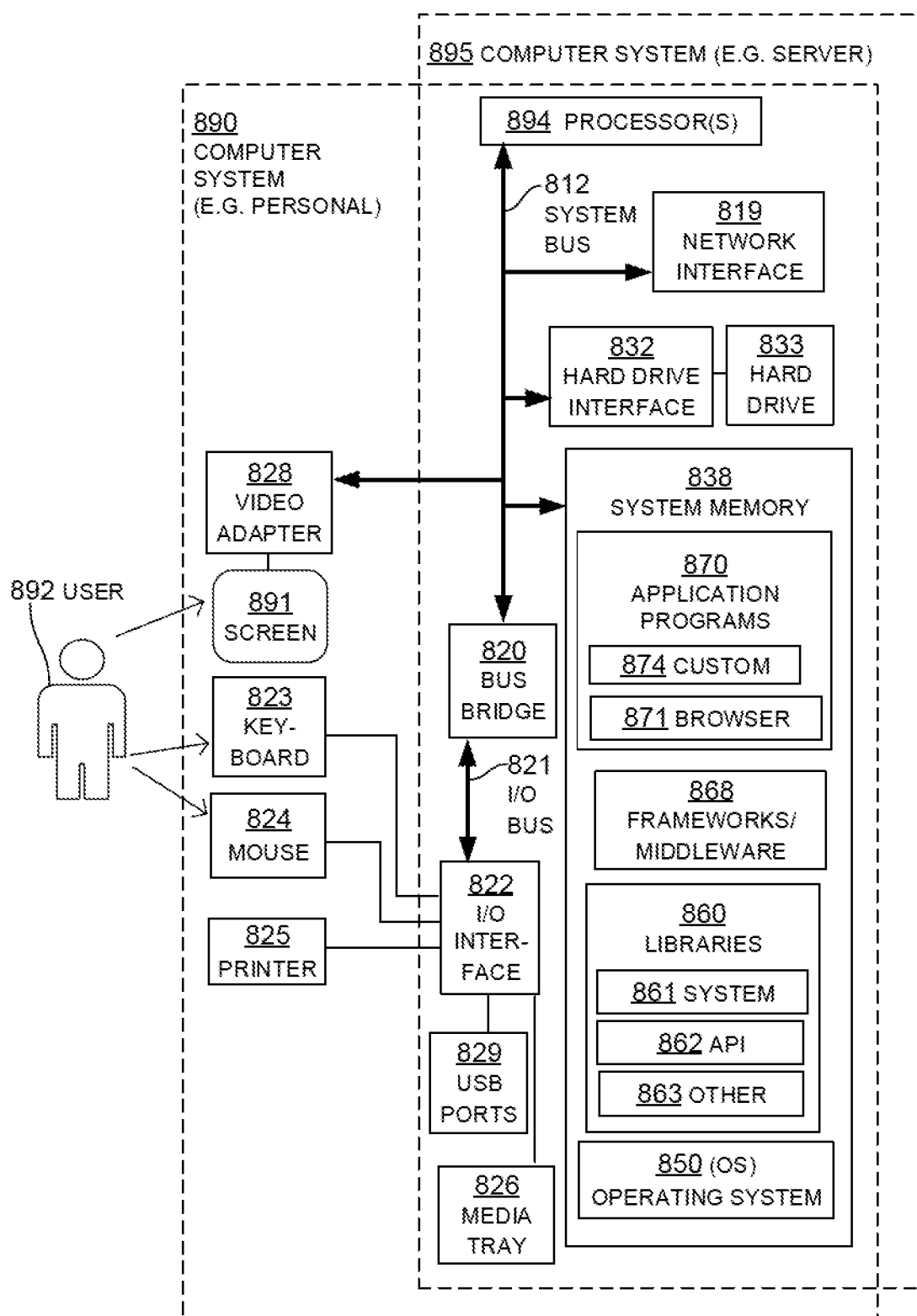
FIG. 8 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure.

FIG. 8 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure.

In the present example, FIG. 8 is a block diagram illustrating components of a sample computer system 890 and a sample computer system 895 according to some exemplary embodiments, which may read instructions from a machine-readable medium (e.g., a non-transitory computer-readable medium) and perform any one or more of the processes, methods, and/or functionality discussed herein. The computer system 895 may be a server, while the computer system 890 may be a personal device, such as a personal computer, a desktop computer, a personal computing device such as a laptop computer, a tablet computer, a mobile phone, and so on. Either type may be used for the computer system 195 and 190 of FIGS. 1A and 1B, a computer system that is part of secondary entity 196 and/or a computer system that is part of any entity or system shown in any of the Figures of the present disclosure.

The computer system 895 and the computer system 890 have similarities, which FIG. 8 exploits for purposes of economy in this document. It will be understood, however, that a component in the computer system 895 may be implemented differently than the same component in the computer system 890. For instance, a memory in a server may be larger than a memory in a personal computer, and so on. Similarly, custom application programs 874 that implement embodiments may be different, and so on.

The computer system 895 includes one or more processors 894. The processor(s) 894 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 894 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 895, or the computer system 890, are not intended to be exhaustive. Rather, they are representative, for highlighting essential components that can be used with embodiments.

The computer system 895 also includes a system bus 812 that is coupled to the processor(s) 894. The system bus 812 can be used by the processor(s) 894 to control and/or communicate with other components of the computer system 895.

The computer system 895 additionally includes a network interface 819 that is coupled to system bus 812. Network interface 819 can be used to access a communications network, such as the network 188. Network interface 819 can be implemented by a hardware network interface, such as a Network Interface Card (NIC), wireless communication components, cellular communication components, Near Field Communication (NFC) components, 5G cellular wireless interfaces, transceivers, and antennas, Bluetooth® components such as Bluetooth® Low Energy, Wi-Fi® components, etc. Of course, such a hardware network interface may have its own software, and so on.

The computer system 895 also includes various memory components. These memory components include memory components shown separately in the computer system 895, plus cache memory within the processor(s) 894. Accordingly, these memory components are examples of non-transitory machine-readable media. The memory components shown separately in the computer system 895 are variously coupled, directly or indirectly, with the processor(s) 894. The coupling in this example is via the system bus 812.

Instructions for performing any of the methods or functions described in this document may be stored, completely or partially, within the memory components of the computer system 895, etc. Therefore, one or more of these non-transitory computer-readable media can be configured to store instructions which, when executed by one or more processors 894 of a host computer system such as the computer system 895 or the computer system 890, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 895 include a non-volatile hard drive 833. The computer system 895 further includes a hard drive interface 832 that is coupled to the hard drive 833 and to the system bus 812.

The memory components of the computer system 895 include a system memory 838. The system memory 838 includes volatile memory including, but not limited to, cache memory, registers and buffers. In embodiments, data from the hard drive 433 populates registers of the volatile memory of the system memory 838.

In some embodiments, the system memory 838 has a software architecture that uses a stack of layers, with each layer providing a particular functionality. In this example the layers include, starting from the bottom, an Operating System (OS) 850, libraries 860, frameworks/middleware 868 and application programs 870, which are also known as applications 870. Other software architectures may include less, more or different layers. For example, a presentation layer may also be included. For another example, some mobile or special purpose operating systems may not provide a frameworks/middleware 868.

The OS 850 may manage hardware resources and provide common services. The libraries 860 provide a common infrastructure that is used by the applications 870 and/or other components and/or layers. The libraries 860 provide functionality that allows other software components to perform tasks more easily than if they interfaced directly with the specific underlying functionality of the OS 850. The libraries 860 may include system libraries 861, such as a C standard library. The system libraries 861 may provide functions such as memory allocation functions, string manipulation functions, mathematical functions, and the like.

In addition, the libraries 860 may include API libraries 862 and other libraries 863, such as for SDKs. The API libraries 862 may include media libraries, such as libraries to support presentation and manipulation of various media formats such as MPEG4, H.264, MP3, AAC, AMR, JPG, and PNG. The API libraries 862 may also include graphics libraries, for instance an OpenGL framework that may be used to render 2D and 3D in a graphic content on the screen 891. The API libraries 862 may further include database libraries, for instance SQLite, which may support various relational database functions. The API libraries 862 may additionally include web libraries, for instance WebKit, which may support web browsing functionality, and also libraries for applications 870.

The frameworks/middleware 868 may provide a higher-level common infrastructure that may be used by the applications 870 and/or other software components/modules. For example, the frameworks/middleware 868 may provide various Graphic User Interface (GUI) functions, high-level resource management, high-level location services, and so forth. The frameworks/middleware 868 may provide a broad spectrum of other APIs that may be used by the applications 870 and/or other software components/modules, some of which may be specific to the OS 850 or to a platform.

The application programs 870 are also known more simply as applications and apps. One such app is a browser 871, which is a software that can permit the user 892 to access other devices in the internet, for example while using a Graphic User Interface (GUI). The browser 871 includes program modules and instructions that enable the computer system 895 to exchange network messages with a network, for example using Hypertext Transfer Protocol (HTTP) messaging.

The application programs 870 may include one or more custom applications 874, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 870 may include Enterprise Resource Planning (ERP) application, accounting applications, financial applications, accounting applications, payment systems applications, database and office applications, contacts application, a word processing application, a location application, a media application, a messaging application, and so on. Applications 870 may be developed for the Windows™ operating system, and/or by using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 870 may use built-in functions of the OS 850, of the libraries 460, and of the frameworks/middleware 868 to create user interfaces for the user 892 to interact with.

The computer system 895 moreover includes a bus bridge 820 coupled to the system bus 812. The computer system 895 furthermore includes an input/output (I/O) bus 821 coupled to the bus bridge 820. The computer system 895 also includes an I/O interface 822 coupled to the I/O bus 821.

For being accessed, the computer system 895 also includes one or more Universal Serial Bus (USB) ports 829. These can be coupled to the I/O interface 822. The computer system 895 further includes a media tray 826, which may include storage devices such as CD-ROM drives, multimedia interfaces, and so on.

The computer system 890 may include many components similar to those of the computer system 895, as seen in FIG. 8. In addition, a number of the application programs may be more suitable for the computer system 890 than for the computer system 895.

The computer system 890 further includes peripheral input/output (I/O) devices for being accessed by a user 892 more routinely. As such, the computer system 890 includes a screen 891 and a video adapter 828 to drive and/or support the screen 891. The video adapter 828 is coupled to the system bus 812.

The computer system 890 also includes a keyboard 823, mouse 824, and a printer 825. In this example, the keyboard 823, the mouse 824, and the printer 825 are directly coupled to the I/O interface 822. Sometimes this coupling is wireless or may be via the USB ports 829.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 894.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

Figure 9:
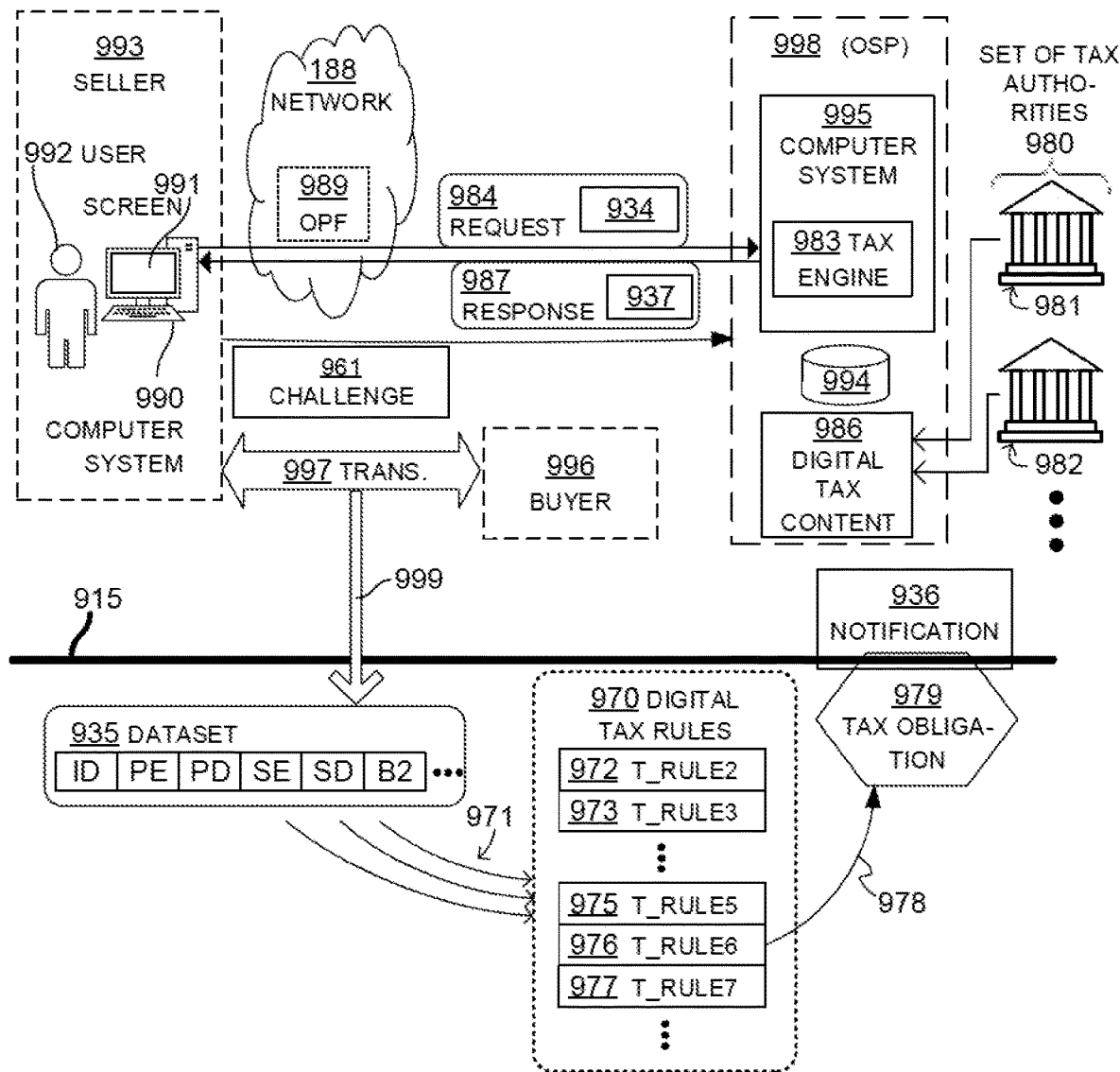
FIG. 9 is a diagram of sample aspects for describing operational examples and use cases of embodiments, according to embodiments of the present disclosure.

The above-mentioned embodiments have one or more uses. Aspects presented below may be implemented as was described above for similar aspects. (Some, but not all, of these aspects have even similar reference numerals.) FIG. 9 is a diagram of sample aspects for describing operational examples and use cases of embodiments, according to embodiments of the present disclosure.

As an example use case, statutes, tax rules, and rates change often, and new tax rules are continuously added. The OSP 998 researches the underlying statutes and tax rules and guidance issued by the tax authorities 980, uses them to generate or obtain digital tax rules 970 to compute tax obligations for the clients, such as seller 993, and makes the research available to all its clients. With more than 10,000 jurisdictions in USA alone, it is a mammoth task to stay on top of these changes and for the OSP 998 to help clients, such as seller 993, stay compliant with their tax obligations. Compliance becomes further complicated when a taxing authority offers a temporary tax holiday, during which certain taxes are waived. Often, the seller 993 may become aware or be informed about such changes before the OSP 998 is informed of such changes or before it is technically able to update the digital tax rules 970. The services of the OSP 998 are used by thousands of clients. When one of those clients indicates an error to a computed tax obligation, such as tax obligation 979 and also submits a correction, then the OSP 998 will compare it against similar requests received from other clients and, based on this comparison, it will prioritize the content research request, make the correction and then offer the corrected content and notify the user.

For example, the seller 993 may transmit challenges as described herein disputing the tax obligation 979 and/or the digital tax rules 970 used to compute the tax obligation 979. To solve such technical problems described above, the tax engine 983 of the OSP 998 disclosed herein may automatically analyze and use such challenges from multiple sellers, such as seller 993, in a more efficient manner to update the digital tax rules and their application accordingly and compute and transmit tax obligations more accurately as described herein.

Thus, the systems and methods described herein for automated actions for facilitating remitting resources improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.]

FIG. 9 is diagram for an operational example and use case where the resource 979 includes a tax obligation of a primary entity, such as seller of goods or services 993 and/or a secondary entity, such as buyer of goods or services 996, due to a transaction 997. It will be recognized that aspects of FIG. 9 have similarities with aspects of FIGS. 1A and 1B. Portions of such aspects may be implemented as described for analogous aspects of FIGS. 1A and 1B. In particular, a thick line 915 separates FIG. 9, although not completely or rigorously, into a top portion and a bottom portion. Above the line 915 the emphasis is mostly on entities, components, their relationships, and their interactions, while below it the emphasis is mostly processing of data that takes place often within one or more of the components above the line 915. Above the line 915, a computer system 995 is shown, which is used to help customers, such as a user 992, with tax compliance. Further in this example, the computer system 995 is part of an OSP 998 that is implemented as a Software as a Service (SaaS) provider, for being accessed by the user 992 online. Alternately, the functionality of the computer system 995 may be provided locally to a user.

The user 992 may be standalone. The user 992 may use a computer system 990 that has a screen 991. In embodiments, the user 992 and the computer system 990 are considered part of the seller 993, which is also known as entity 993. The seller 993 can be a business, such as a seller of items, a reseller, and so on. The user 992 can be an employee, a contractor, or otherwise an agent of the entity 993. In use cases, the seller 993 and the buyer 996 are performing the buy-sell transaction 997. The transaction 997 will have data that is known to the entity 993, similarly with what was described by the relationship instance 197 of FIG. 1B.

In a number of instances, the user 992 and the seller 993 use software applications to manage their business activities, such as sales, resource management, production, inventory management, delivery, billing, and so on. The user 992 and/or the seller 993 may further use accounting applications to manage purchase orders, reservations, bookings, sales invoices, refunds, payroll, accounts payable, accounts receivable, and so on. Such software applications, and more, may be used locally by the user 992 or from an Online Processing Facility (OPF) 989 that has been engaged for this purpose by the user 992, and/or the seller. In such use cases, the OPF 989 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective domains (e.g., respective tax jurisdictions). A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived. Often, the seller 993 may become aware or be informed about such changes before the OSP 998 is informed of such changes and may transmit challenges as described herein disputing the tax obligation 979 and/or the digital tax rules 970 used to compute the tax obligation. The OSP 998 may automatically analyze and use such challenges from multiple sellers, such as seller 993, to update the digital tax rules accordingly and compute more accurate tax obligations as described herein.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

In an example case, the OSP 998 may have produced a resource, such as computed a tax obligation 979, which is based on one or more of the digital tax rules 970 that is outdated, not currently applicable or applied incorrectly based on one or more of the issues noted above and/or other considerations. For instance, there may currently be a sales tax holiday and the tax obligation 979 is computed based on there not being a tax holiday. The seller 993 may receive the notification 936 including such tax obligation 936 via network 188 and realize there has been an error because of the tax holiday that the seller 993 is aware of. Utilizing a dispute opportunity provided by the OSP 998 via network 188 as described herein, the seller 993 may then transmit a tax obligation computation challenge 961 regarding the tax obligation 936 indicating that the amount of tax due should be zero due to the tax holiday. The seller may also include supplemental information (or a link to supplemental information) indicating for example, the correct rule, correct item information, correct location information, correct nexus information, the correct underlying statutes and tax rules and guidance issued by the tax authorities 980 and/or other reasons supporting why the seller 993 believes tax obligation 979 was incorrect. The seller's challenge 961 may be ranked higher, or a digital tax rule bucket into which it is classified may be ranked higher, based on such supplemental information. The OSP 998 may determine whether and when to update the digital tax rules 970 based on such rankings.

The OSP 998 may also provide one or more rewards to the seller 993 and/or user 992 via network 188 based on the quality, speed and accuracy of, and/or supplemental information included with, the challenge 961. The OSP 998 may automatically analyze and use such challenges, such as challenge 961, from multiple sellers, such as seller 993, to update the digital tax rules accordingly and compute more accurate tax obligations as described herein. For example, the digital tax rules 970 which have had the most and/or highest quality challenges made against them, will be updated first. In other embodiments, the digital tax rules 970 which have had a minimum threshold of challenges meeting minimum requirements made against them will be updated.

To help with such complex determinations and solve such technical problems, the computer system 995 may be specialized device for tax compliance as disclosed herein. The computer system 995 may have one or more processors and memory, for example, as was described for the computer system 195 of FIG. 1. The computer system 995 thus implements a tax engine 983 to make the determinations of tax obligations, provide dispute opportunities, receive challenges and update the digital tax rules 970 based on those received challenges. The tax engine 983 can be as described for the service engine 183.

The computer system 995 may further store locally entity data, i.e. data of user 992, of entity 993, any of which/whom may be a customer, and/or a seller or a buyer in a sales transaction in various embodiments. The entity data may include profile data of the customer and transaction data from which a determination of a tax obligation is desired. In the online implementation of FIG. 9, the OSP 998 has a database 994 for storing the entity data. This entity data may be inputted by the user 992, and/or caused to be downloaded or uploaded by the user 992 from the computer system 990 or from the OPF 989, or extracted from the computer system 990 or from the OPF 989, and so on. In other implementations, a simpler memory configuration may suffice for storing the entity data.

A digital tax content 986 is further implemented within the OSP 998. The digital tax content 986 can be a utility that stores digital tax rules 970 for use by the tax engine 983. As part of managing the digital tax content 986, there may be continuous updates of the digital tax rules, by inputs gleaned from a set 980 of different tax authorities 981, 982, . . . . Updating may be performed by humans, or by computers, and so on. As mentioned above, the number of the different tax authorities in the set 980 may be very large and the updating may be based on challenges received to compute tax obligations and/or the digital rules 970 used to compute such tax obligations.

For a specific determination of a tax obligation, the computer system 995 may receive one or more datasets. A sample received dataset 935 is shown just below line 915, which can be similar to what was described for the dataset 135 of FIG. 1B. In this example, the computer system 990 transmits a request 984 that includes a payload 934, and the dataset 935 is received by the computer system 995 parsing the received payload 934. In this example the single payload 934 encodes the entire dataset 935, but that is not required, as mentioned earlier.

In this example, the dataset 935 has been received because it is desired to determine any tax obligations arising from the buy-sell transaction 997. As such, the sample received dataset 935 has values that characterize attributes of the buy-sell transaction 997, as indicated by an arrow 999. (It should be noted that the arrow 999 describes a correspondence, but not the journey of the data of the buy-sell transaction 997 in becoming the received dataset 935.) Accordingly, in this example the sample received dataset 935 has a value ID for an identity of the dataset 935 and/or the transaction 997. The dataset 935 also has a value PE for the name of the seller 993 or the user 992, which can a the seller making sales transactions, some online. The dataset 935 further has a value PD for relevant data of the seller 993 or the user 992, such as an address, place(s) of business, prior nexus determinations with various tax jurisdictions, and so on. The dataset 935 also has a value SE for the name of the buyer 996. The dataset 935 further has a value SD for relevant data of the buyer 996, entity-driven exemption status, and so on. The dataset 935 has a value B2 for the sale price of the item sold.

The dataset 935 may fewer values or have additional values, as indicated by the dot-dot-dot in the dataset 935. These values may characterize further attributes, such as characteristics of the item being sold, data identifying of or otherwise relating to a license or registration required for the transaction, a date and possibly also time of the transaction 997, and so on.

The digital tax rules 970 have been created so as to accommodate tax rules that the set 980 of different tax authorities 981, 982 . . . promulgate within the boundaries of their tax jurisdictions. In FIG. 5, five sample digital tax rules are shown, namely T_RULE2 972, T_RULE3 973, T_RULE5 975, T_RULE6 976 and T_RULE7 977. Additional digital tax rules 970 are suggested by the vertical dot-dot-dots. Similarly with FIG. 1B, some of these digital tax rules may be digital main rules that determine the tax obligation 979, while others can be digital precedence rules that determine which of the digital main rules is to be applied in the event of conflict. In some use cases, digital main rules may be about a sales tax or use tax being owed due to the transaction 997 at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax rules that determine whether particular digital tax rules are to be applied based on one or more tax jurisdictions associated with a transaction, such as transaction 997.

Similarly with FIG. 1B, these digital tax rules 970 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 935 can be iteratively tested against these logical conditions according to arrows 971. In such cases, the consequents may indicate one or more tax obligations, such as to indicate different types of taxes that are due, rules, rates, exemption requirements, reporting requirements, remittance requirements, etc.

In this example, a certain digital tax rule T_RULE6 976 is shown as identified and used, which is indicated also by the beginning of an arrow 978. Identifying may be performed responsive to the values of the dataset 935, which are shown as considered for digital tax rules 970 by arrows 971. For example, it can be recognized that a condition of the digital tax rule T_RULE6 976 is met by one or more of the values of the dataset 935.

As such, the computer system 995 may produce the tax obligation 979 and tax return document, which is akin to producing the resource 179 of FIG. 1B. The computer system 995 may also file or otherwise send (or cause to be filed or sent) the tax return document to one or more of the applicable tax authorities in the set of tax authorities 980 via network 188. The tax obligation 979 can be produced by the computer system 995 applying the certain digital tax rule T_RULE6 976, as indicated by the arrow 978. In this example, the consequent of the identified certain digital tax rule T_RULE6 976 may specify that a sales tax is due for an item, the amount is to be determined by a multiplication of the sale price of the value B2 by a specific rate, the tax return form that needs to be prepared and filed, a date by which it needs to be filed, and so on.

The computer system 995 may then cause a notification 936 to be transmitted. The notification 936 can be about an aspect of the tax obligation 979, similarly with the notification 136 of FIG. 1B. In the example of FIG. 9, the notification 936 is caused to be transmitted by the computer system 995 as an answer to the received dataset 935. The notification 936 can be about an aspect of the tax obligation 979. In particular, the notification 936 may inform about the aspect of the tax obligation 979, namely that it has been determined, where it can be found, what it is, or at least a portion or a statistic of its content, and so on.

The notification 936 can be transmitted to one of an output device and another device that can be the remote device, from which the dataset 935 was received. The output device may be the screen of a local user or a remote user. The notification 936 may thus cause a desired image to appear on the screen, such as within a Graphical User Interface (GUI) and so on. The other device may be a remote device, as in this example. In particular, the computer system 995 causes the notification 936 to be communicated by being encoded as a payload 937, which is carried by a response 987. The response 987 may be transmitted via the network 188 responsive to the received request 984. The response 987 may be transmitted to the computer system 990, or to OPF 989, and so on. As such, the other device can be the computer system 990, a device of the OPF 989, or the screen 991 of the user 992, and so on. In this example the single payload 937 encodes the entire notification 936, but that is not required, similarly with what is written above about encoding datasets in payloads. Along with the aspect of the tax obligation 979, it is advantageous to embed in the payload 937 the ID value, one or more values of the dataset 935 and/or one or more of the digital tax rules 970 used to compute the tax obligation 979. This will help the recipient correlate the response 987 to the request 984, and therefore match the received aspect of the tax obligation 979 as the answer to the received dataset 935, as well as verify the correct digital tax rule was applied in the correct manner in order to enable challenges to incorrect or misapplied digital tax rules.

Figure 10A:
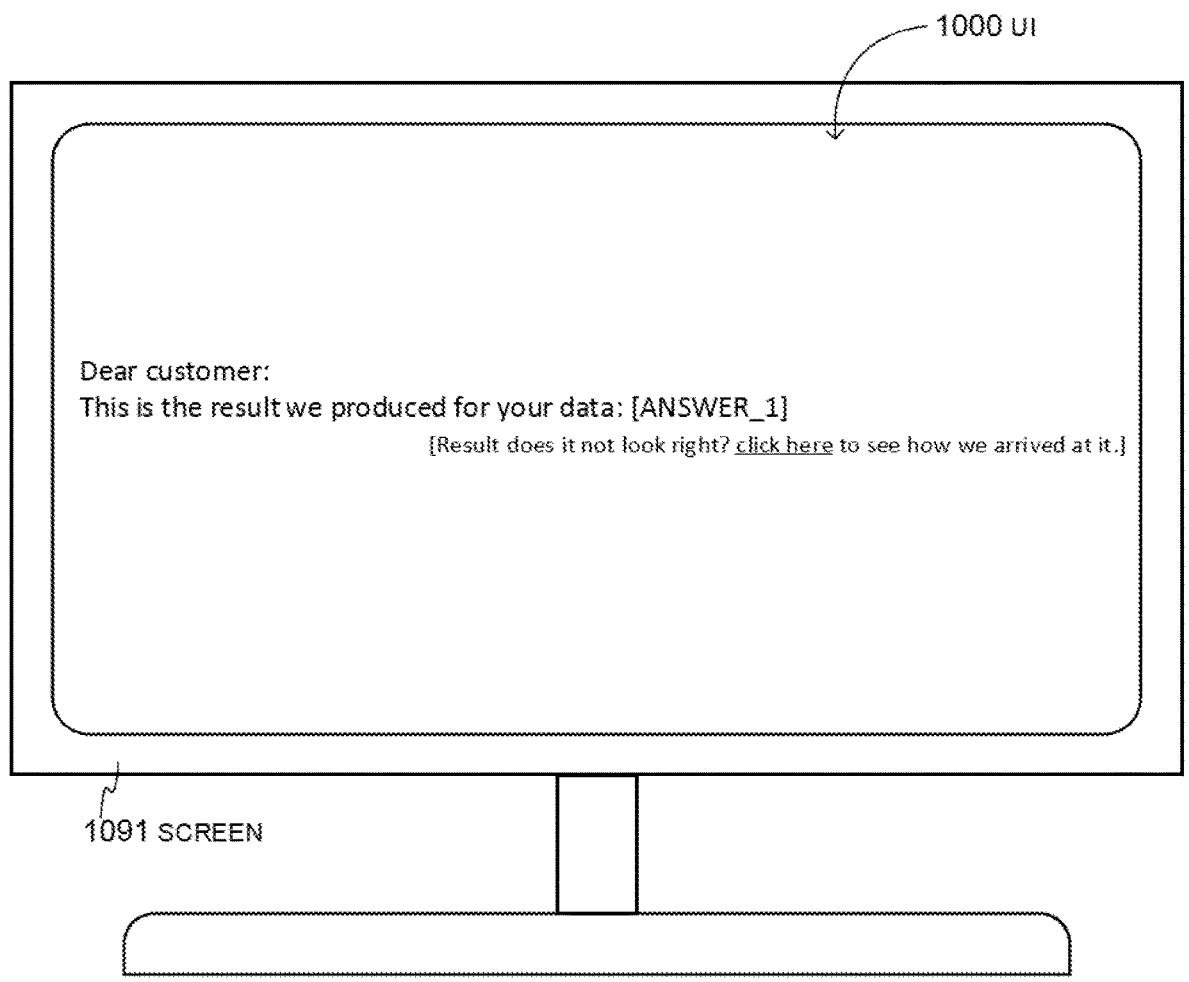
FIG. 10A is a sample view of a User Interface (UI) in which a notification is presented to a user regarding a produced resource with a selectable option to view how the OSP arrived at the resource, according to embodiments of the present disclosure.

FIG. 10A is a sample view of a UI 1000 in which a notification 936 of FIG. 9 is presented to a user regarding the produced tax obligation 979 with a selectable option that the user 992 may select to view how the OSP 998 arrived at the tax obligation 979 (represented by the text "[ANSWER_1]"), according to embodiments of the present disclosure. Shown is UI 1000 presented on a screen 1091 of a device. For example, the screen 1091 may be screen 991 of the computer system 990 or other device of the seller 993 or user 992. The OSP 998 causes the certain resource (e.g., tax obligation 979) to be presented in the UI. In particular, the tax obligation 979 may have been computed by the OSP 998 in response to and based on applying a selected digital tax rule (e.g., indicating a particular tax rate) of the digital tax rules 970 to the dataset 935 representing the transaction 997 between the seller 993 and the buyer 996.

Figure 10B:
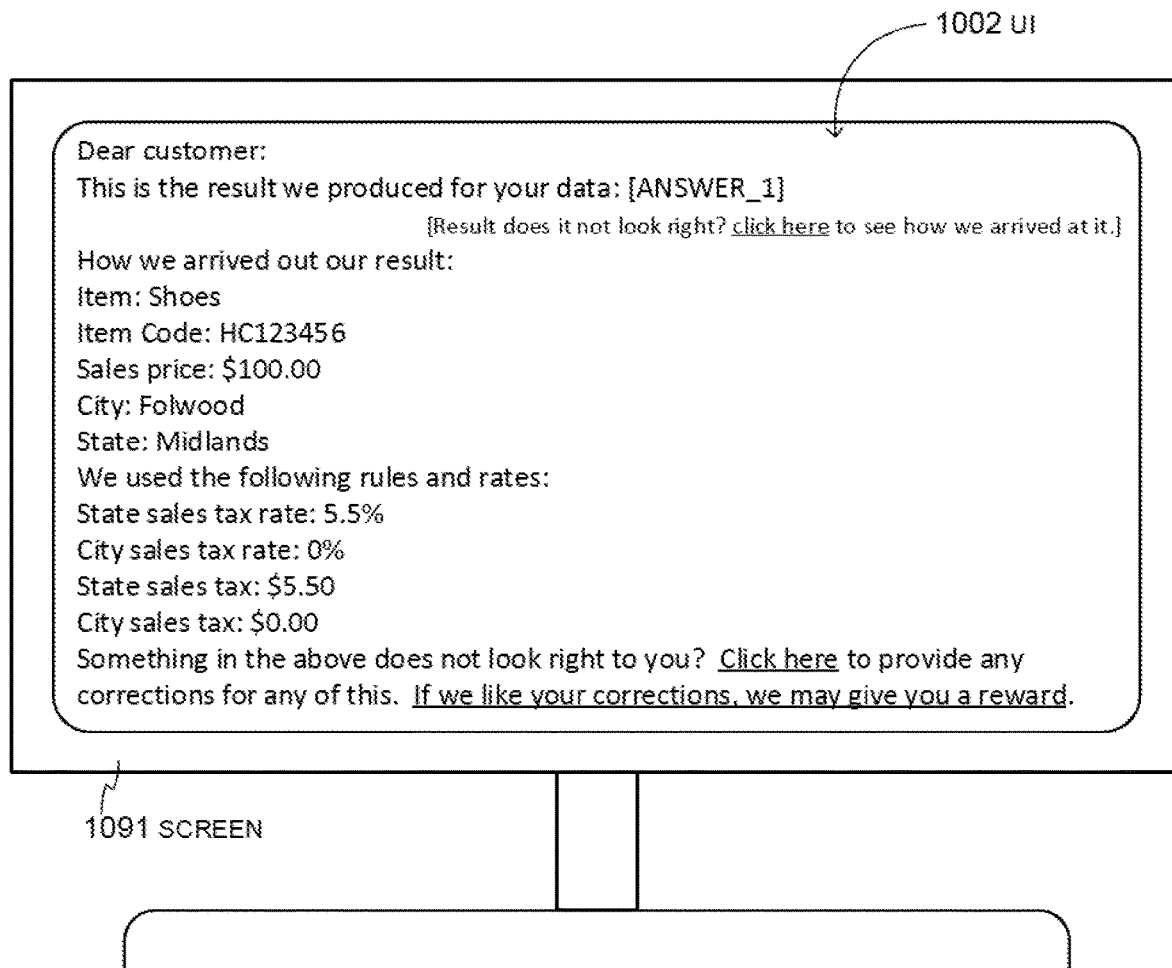
FIG. 10B is a sample view of a User Interface (UI) that may be presented in response to the user selecting the selectable option of FIG. 10A to view how the OSP arrived at the resource and includes a selectable option to dispute aspects of digital rules used in how the OSP arrived at the resource, according to embodiments of the present disclosure.

FIG. 10B is a sample view of a UI 1002 that may be presented in response to the user selecting the selectable option of FIG. 10A to view how the OSP 998 arrived at the tax obligation 979 of FIG. 9 and includes a selectable option that the user 992 may select to dispute aspects of digital rules used by the OSP 998 in arriving at the tax obligation 979, according to embodiments of the present disclosure. Shown is UI 1002 presented on a screen 1091 of a device. For example, the screen 1091 may be screen 991 of the computer system 990 or other device of the seller 993 or user 992.

As shown in the present example of FIG. 10B, the transaction 997 is for a pair of shoes. The UI 1002 indicates the transaction information extracted from dataset 935 (e.g., type of item, item code, tax jurisdiction location associated with transaction) and the various tax rules and rates (e.g., state sales tax rate and city sales tax rate) used to arrive at the tax obligation 979 of FIG. 9. In the present example, the UI 1002 shows the sale price for the shoes was $100, the state sales tax rate used was 5.5% and the city sales tax rate used was 0%. The UI 1002 shows the resulting state sales tax obligation is thus $5.50 and the resulting city sales tax obligation is $0.00. The UI also provides selectable user interface element (e.g., a link) that the user may select to submit a challenge disputing such information as the sales tax computed and/or the tax rates displayed on UI 1002. Activating the link causes the dispute opportunity to be thus presented. The UI 1002 also provides selectable user interface element (e.g., a link) that the user 992 may select to obtain more information regarding obtaining a reward for submitting such challenges. Thus, the OSP 998 causes a dispute opportunity to be presented in conjunction with a certain resource in the UI 1002 of certain remote device, such as computer system 990.

Figure 10C:
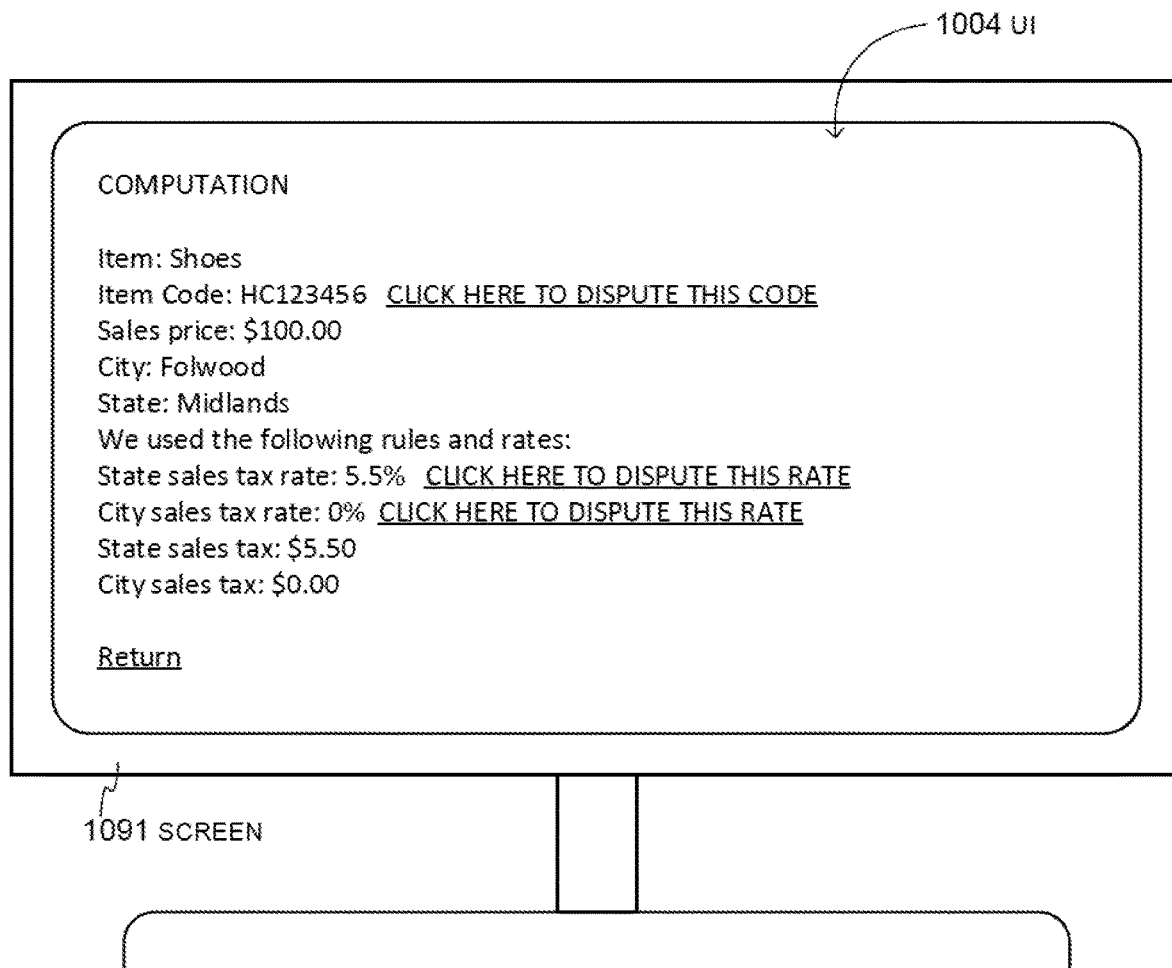
FIG. 10C is a sample view of a User Interface (UI) that may be presented in response to the user selecting the selectable option of FIG. 10B to dispute aspects of digital rules and includes individual selectable options to dispute particular aspects of digital rules used in how the OSP arrived at the resource, according to embodiments of the present disclosure.

FIG. 10C is a sample view of a UI 1004 that may be presented in response to the user selecting the selectable option of FIG. 10B to dispute aspects of digital rules and includes individual selectable options to dispute particular aspects of digital rules used in how the OSP arrived at the tax obligation 979 of FIG. 9, according to embodiments of the present disclosure. Shown is UI 1004 presented on a screen 1091 of a device. For example, the screen 1091 may be screen 991 of the computer system 990 or other device of the seller 993 or user 992. In the present example, the UI 1004 provides selectable user interface elements that the user 992 may individually select to submit respective challenges disputing the item code, the state sales tax rate and the city sales tax rate.

Figure 11A:
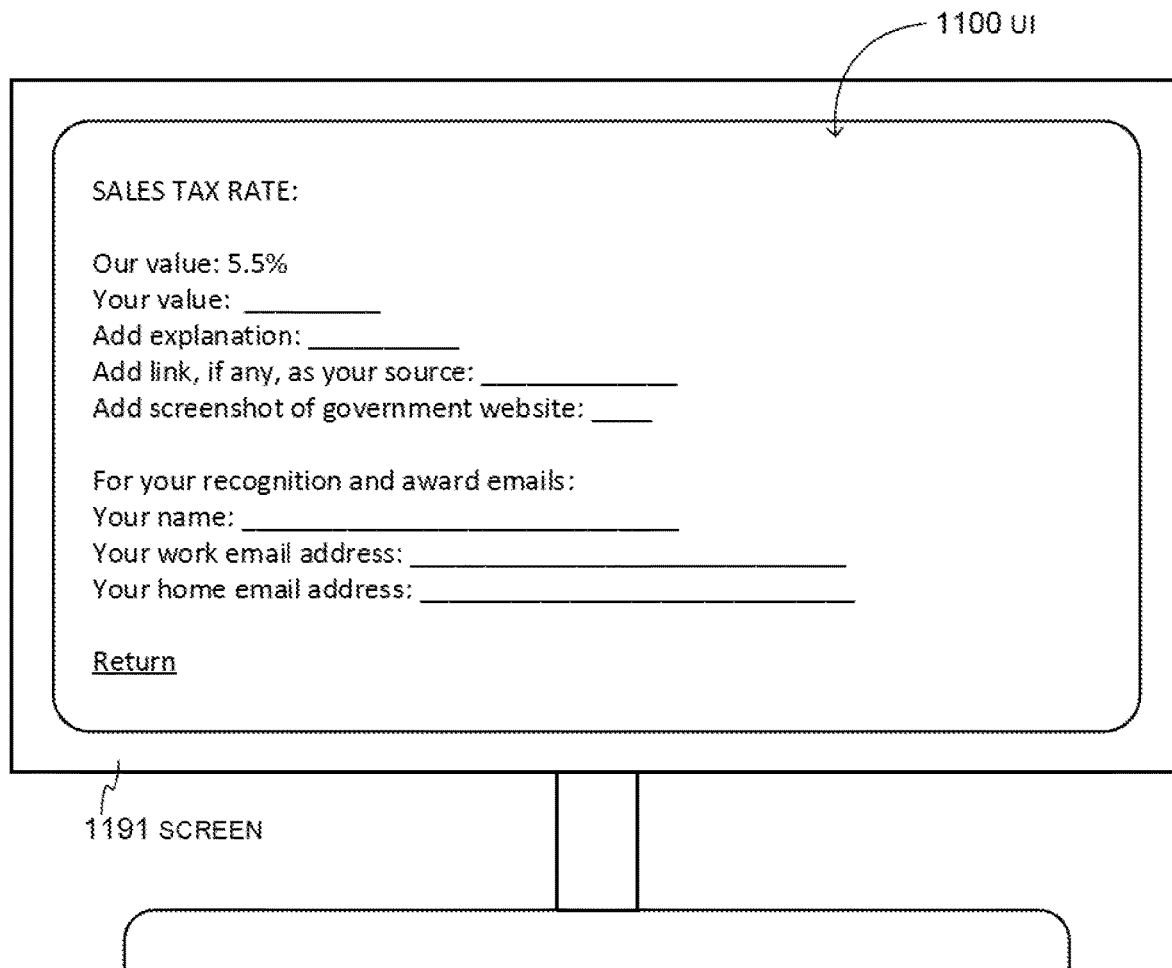
FIG. 11A is a sample view of a User Interface (UI) that may be presented in response to the user selecting the selectable option of FIG. 10C to dispute the sales tax rate aspect used to produce the resource and includes individual entry fields to enter corrections and other information regarding the disputed sales tax aspect, according to embodiments of the present disclosure.

FIG. 11A is a sample view of a UI 1100 that may be presented in response to the user 992 selecting the selectable option of FIG. 10C to dispute the state sales tax rate aspect used to produce the tax obligation 979 and includes individual entry fields to enter corrections and other information regarding the disputed sales tax aspect, according to embodiments of the present disclosure.

Shown is UI 1100 presented on a screen 1191 of a device. For example, the screen 1191 may be screen 991 of the computer system 990 or other device of the seller 993 or user 992. In the present example, the UI 1100 provides challenged fields for the user 992 to make entries as a result of the user selecting the selectable user interface element of FIG. 10C to dispute the state sales tax rate of 5.5%, as well as a space for text explanation and entry fields for inputting information to receive recognition and award emails.

FIG. 11B is a sample view of UI 1102 that may be presented in after the user 992 has entered input to the individual challenged fields of FIG. 11A to include corrections and other information regarding the disputed state sales tax aspect, according to embodiments of the present disclosure.

Shown is UI 1102 presented on a screen 1191 of a device. For example, the screen 1191 may be screen 991 of the computer system 990 or other device of the seller 993 or user 992. In the present example, the user 992 has made entries into the challenged fields including a corrected tax rate of 0%, indicating an explanation that there was a tax holiday during the sale of the shoes, and providing a link to the authority supporting the explanation and corrected tax rate for the transaction. The user may select the "Return" user interface element for the challenges to be received by the OSP 998 as such entries to the challenged fields. The user has also entered their name, work email address and home or personal email address for receiving recognition and award emails including rewards for providing the challenge to the state tax rate and supporting link.

Figure 12:
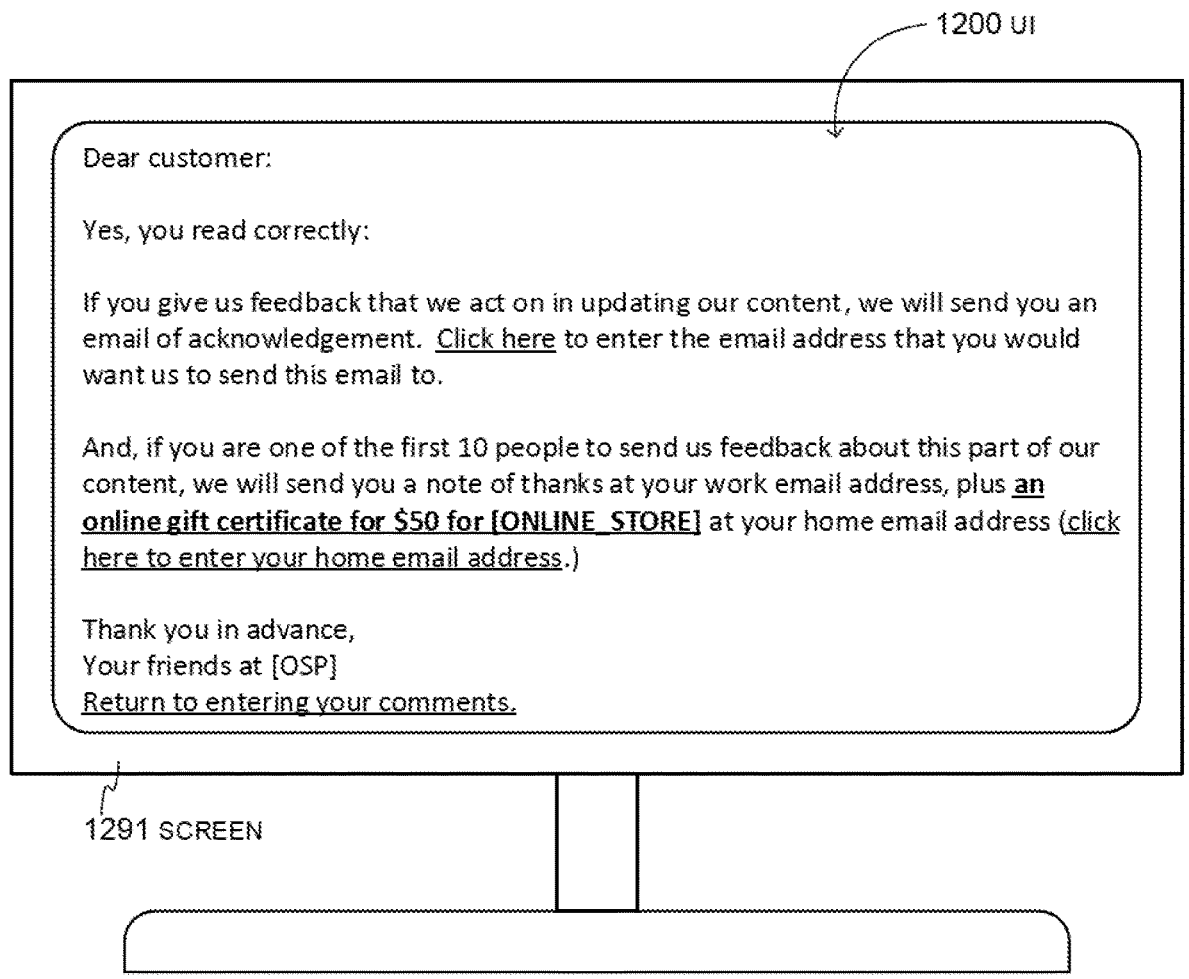
FIG. 12 is a sample view of a User Interface (UI) for a user to enter an email address to which an acknowledgement of a challenge disputing a produced resource may be sent and to enter a separate email address which may be used to transmit a reward for the challenge disputing the produced resource, according to embodiments of the present disclosure.

FIG. 12 is a sample view of a UI 1200 for a user 992 to enter an email address to which an acknowledgement of a challenge disputing a computed tax obligation 979 may be sent and to enter a separate email address which may be used to transmit a reward for the challenge disputing the computed tax obligation 979, according to embodiments of the present disclosure.

Shown is UI 1200 presented on a screen 1291 of a device. For example, the screen 1291 may be screen 991 of the computer system 990 or other device of the seller 993 or user 992. In the present example, the UI 992 may be presented, for example, in response to the user 992 selecting the "If we like your corrections, we may give you a reward" element of FIG. 10B and indicates a condition for receiving a particular reward. In particular, the challenge must be among a first N challenges to be received for the challenged resource (e.g., the tax obligation 979 computed according to the challenged state tax rate), where N is a selected number by the OSP 998 (10 in the present example). In one embodiment, the reward will be transmitted in response to, and only if, the certain challenge is among a first N challenges to be received for the challenged resource based on the ranking within the bucket associated with the challenged state tax rate. In the present example, the reward is online gift certificate for $50 at an online store. Also presented is a selectable user interface element that the user 992 may select to return to entering their comments regarding the computed tax obligation 979.

Figure 13A:
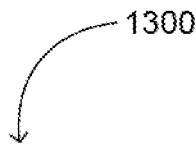
FIG. 13A is an example electronic record of an initial correction report corresponding to the information entered in the UI shown in FIG. 11B, according to embodiments of the present disclosure.

FIG. 13A is an example electronic record 1300 of an initial correction report corresponding to the information entered in the UI 1102 shown in FIG. 11B, according to embodiments of the present disclosure. For example, the record 1300 may be stored as part of a database 994 or otherwise accessible by the OSP 998.

In an embodiment, the electronic record 1300 may be generated and stored by the OSP 998 in response to the user 992 entering information in the UI 1102 shown in FIG. 11B. In the present example, the record 1300 includes values and labels for those values. In some embodiments, the labels for the various data values need not be present in the electronic record 1300, but are shown in FIG. 13A for illustrative purposes.

Included in the electronic record 1300 is the type of rule corrected 1302, which is "Sales Tax Rate" 1330; the jurisdiction state 1304, which is "Midlands"1332; the jurisdiction city 1306, which is "Folwood" 1334; the new rate 1308 entered by the user 992, which is "0" 1336; the explanation 1310 entered by the user 992, which is "tax holiday during sale" 1338; the link 1312 supporting the new rate 1308 entered by the user 992, which is www.state.dor.gov/news/2020/06 1340; a screenshot 1314 (or link thereto), if any, provided by the user 992, which has a value of "(not provided)" 1342 because the user 992 did not provide any screenshot; the reporter name 1316 entered by the user 992 reporting the challenge, which is "Alexandra Smith" 1346; the reporter work email 1318 entered by the user 992, which is "Alexandra.Smith@xyz.com" 1348; the reporter home email 1320 entered by the user 992, which is "Alexandra.Smith@mypersonalemail.com" 1350; the reporting time and date 1322 indicating the time and date the challenge was submitted, which is "2020-07-02; 09:48:48 am" 1352; the comment score 1324, which may be based on the existence of the link 1312, the existence of the proposed new rate 1308, the existence of an explanation 1310, or other information regarding the challenge entered by the user 992, which is "8" 1354; a verification indication 1326 indicating whether or not the challenge has been verified by the OSP 998, which is blank because the challenge has not yet been verified; and a rank 1328 indicating the ranking of the bucket into which the challenge was classified, which is blank because the challenge has not yet been verified and thus has not yet been classified into a bucket. However, in some embodiments, the rank may be assigned when the challenge is received before it is verified.

Figure 13B:
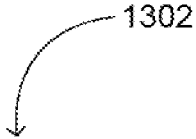
FIG. 13B is an example electronic record of an updated correction report corresponding to the information entered in the UI shown in FIG. 11B challenging an aspect of a digital rule after the correction to the aspect of the digital rule has been verified and the rank of the bucket into which the challenge to the digital rule has been classified has been updated, according to embodiments of the present disclosure.

FIG. 13B is an example electronic record 1302 of an updated correction report corresponding to the information entered in the UI 1102 shown in FIG. 11B challenging the tax computed tax obligation 979 after the correction to the aspect of the digital rule used to compute the tax obligation 979 has been verified by the OSP 998 and the rank 1328 of the bucket into which the challenge to the computed tax obligation 979 has been classified has been updated, according to embodiments of the present disclosure. In particular, in the present example, the challenge to the computed tax obligation 979 has now been verified (e.g., by a reviewer checking the entered link 1312, explanation 1310 and/or other information) indicated by the "Comment correct" value 1356 and thus has been classified into a corresponding bucket as described herein. For example, the corresponding bucket currently has a rank of "1" 1358 based on the challenge indicated by the electronic record 1302 being verified and classified into that bucket. However, in some embodiments, the rank may be assigned when the challenge is received before it is verified.

In some embodiments, the comment score of the challenge may be a factor affecting the rank 1328 of the bucket into which it is classified. For example, a higher comment score may increase the rank of the bucket into which the challenge having the comment is classified. The link 1312 may also be verified based on meeting credibility criteria, such as whether the link points to a governmental authority or source. In some embodiments, the affected digital rules may be sorted by rank of the bucket into which they were classified over a selectable specific time period (e.g., over one day, one hour, etc.).

Figure 14A:
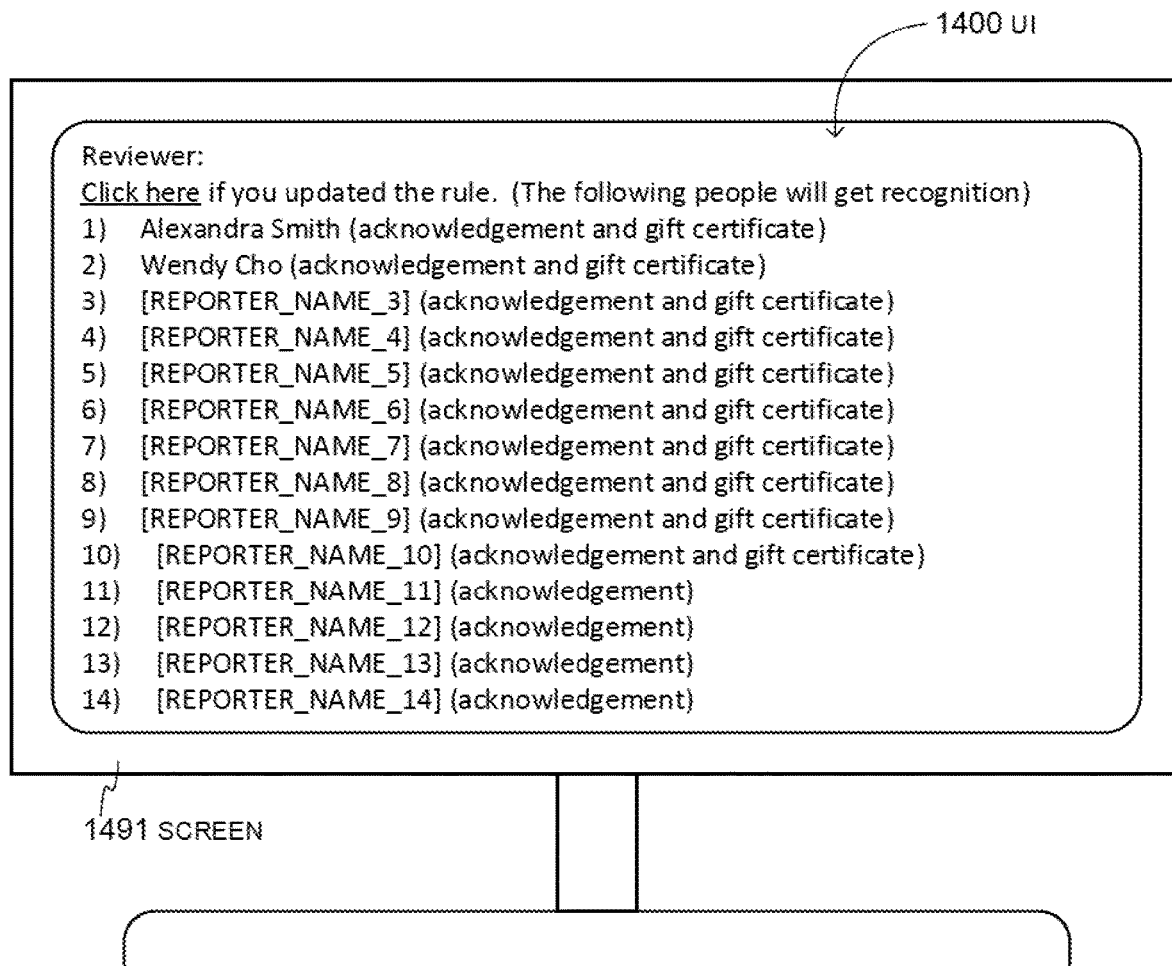
FIG. 14A is a sample view of an internal UI of the OSP that may be presented in an email to an internal reviewer of challenges to a digital rule for sending acknowledgements and rewards to those reporting challenges to the digital rule, according to embodiments of the present disclosure.

FIG. 14A is a sample view of an internal UI 1400 of the OSP 998 that may be presented in an email to an internal reviewer of challenges to a digital rule for sending acknowledgements and rewards to those reporting challenges to the digital rule, according to embodiments of the present disclosure. Shown is UI 1400 presented on a screen 1491 of a device. For example, the screen 1491 may be screen of the computer system 995 or other device of the OSP 998.

Provided in the UI 1400 is a user interface element that the internal reviewer may select to indicate whether the challenged digital tax rule (e.g., T_RULE6 976 of FIG. 9) has been updated based on received challenges. In an embodiment, the people listed may receive acknowledgements and rewards as indicated in response to the reviewer selecting the element to indicate the challenged rule has been updated. In the present example, the UI 1400 displays a list of people who had submitted challenges and which of them will receive recognition by an acknowledgement and whether each will be getting an additional reward, such as in response to the challenges they submitted meeting one or more conditions as described herein. For example, as indicated in the UI 1400, the first 10 people who submitted a verified challenge will receive an acknowledgement and a gift certificate as a reward, while the remaining people will only receive an acknowledgement.

Figure 14B:
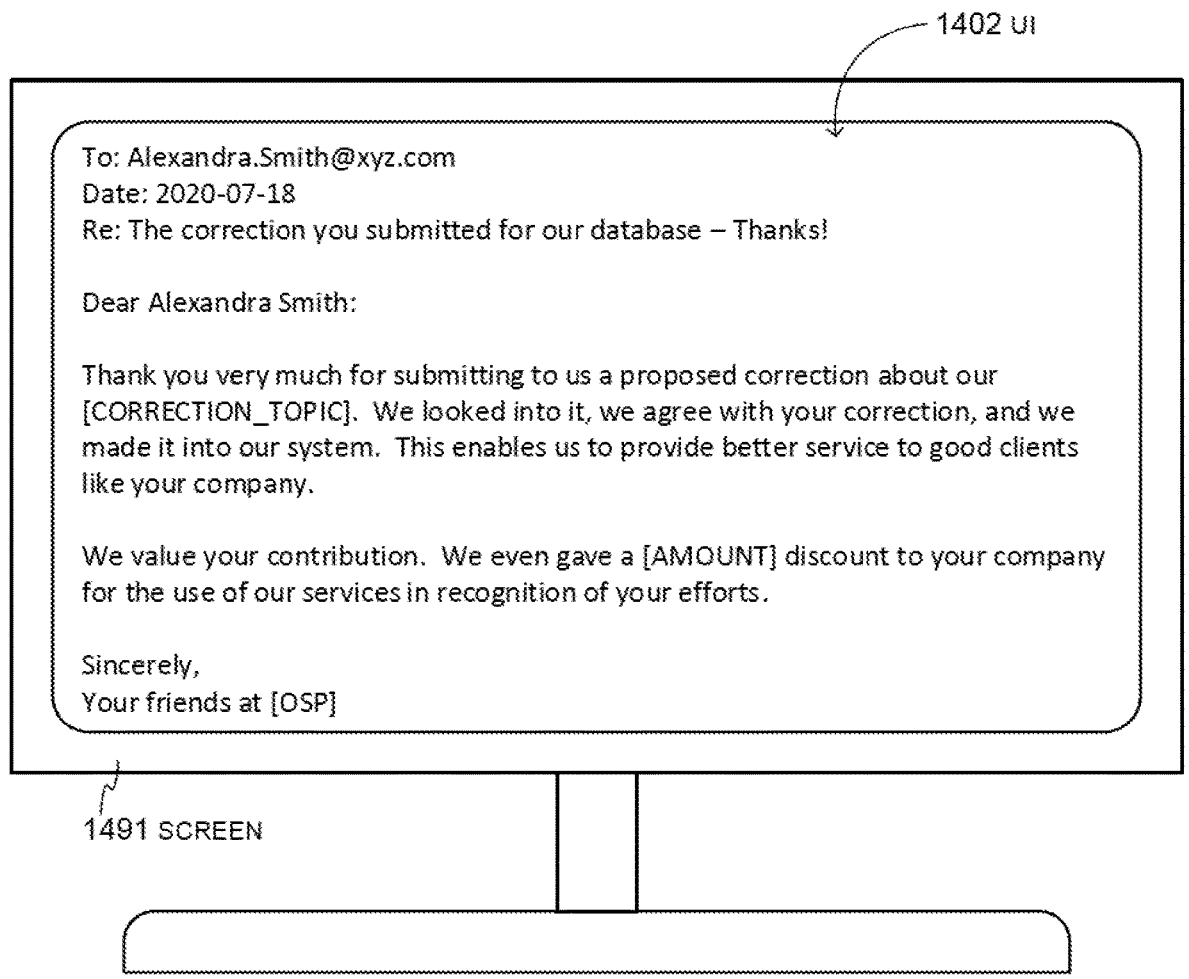
FIG. 14B is a sample view of a UI that may be presented in an email to a user that reported a challenge to a digital rule based on to those reporting challenges to the digital rule shown in FIG. 14A, sending an acknowledgement and reward to the user and adapted for sharing with co-workers, according to embodiments of the present disclosure.

FIG. 14B is a sample view of a UI 1402 that may be presented in an email to a user 992 that reported a challenge to a digital tax rule based on those users shown in FIG. 14A reporting challenges to the digital tax rule. Shown is UI 1402 presented on a screen 1491 of a device. For example, the screen 1491 may be screen 991 of the computer system 990 or other device of the seller 993 or user 992. In some embodiments, an email having UI 1402 may be sent in response to the reviewer selecting the element of FIG. 14A to indicate the challenged rule has been updated. The UI 1402 is of an email sending an acknowledgement and reward to the user 992 and is adapted for sharing with co-workers, according to embodiments of the present disclosure. In particular, the user Alexandra Smith may be sent an email to the work email address she provided, such as that shown in FIG. 14B, indicating a reward as a discount to her company instead of a personal gift certificate, and is thus adapted for sharing with co-workers. In some embodiments, such an email adapted for sharing with co-workers is considered a TIER-1 email. In various embodiments, the UI 1402 may be presented as a message in a customer user interface portal (CUP), such as in the challenge tool interface 126 of FIG. 1A.

Figure 14C:
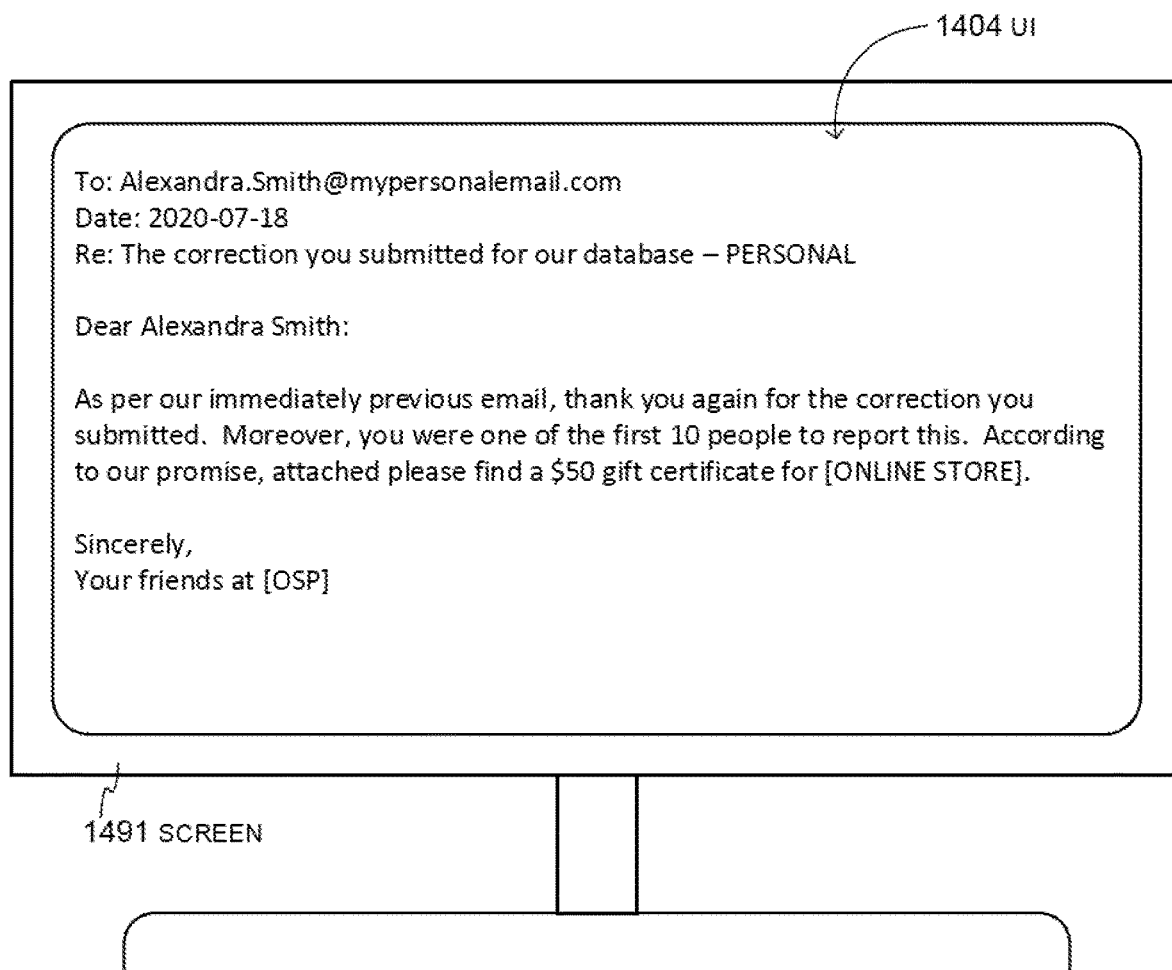
FIG. 14C is a sample view of a UI that may be presented in an email to a user that reported a challenge to a digital rule based on to those reporting challenges to the digital rule shown in FIG. 14A, sending an acknowledgement and reward to the user and adapted to be personal to the user, according to embodiments of the present disclosure.

FIG. 14C is a sample view of a UI 1404 of a different email that may be presented in an email to a user 992 that reported a challenge to a digital tax rule based on to those users shown in FIG. 14A reporting challenges to the digital tax rule. For example, the screen 1491 may be screen 991 of the computer system 990 or other device of the seller 993 or user 992. In some embodiments, an email having UI 1404 may be sent in response to the reviewer selecting the element of FIG. 14A to indicate the challenged rule has been updated. The UI 1404 is of an email sending an acknowledgement and reward to the user and adapted to be personal to the user, according to embodiments of the present disclosure. In particular, the user Alexandra Smith may be sent an email may be sent an email to the home or personal email address she provided, such as that shown in FIG. 14C, indicating personal gift certificate as a reward instead of a discount to her company, and is thus adapted to be personal to the user Alexandra Smith. In some embodiments, such an email adapted to be more personal and including such an award is considered a TIER-2 email. In various embodiments, the UI 1402 may be presented as a message in a customer user interface portal (CUP), such as in the challenge tool interface 126 of FIG. 1A.

In various embodiments, a method for producing resources according to digital rules may include receiving datasets from first remote devices via a network, the datasets having respective dataset values; accessing stored digital rules in response to receiving the datasets; identifying respective ones of the stored digital rules for respective ones of the datasets responsive to at least one of the dataset values of the respective datasets; producing, by applying the respective digital rules to the respective datasets, respective resources; causing notifications to be transmitted via a network to the first remote devices, the notifications being about aspects of the resources; receiving, from second remote devices via a network, challenges responsive to at least some of the notifications, the challenges disputing challenged ones of the resources; classifying the challenges into buckets according to respective challenged ones of the digital rules that were applied to produce the respective ones of the challenged resources; computing respective statistics for the buckets; ranking the buckets by at least causing a selected one of the buckets to be presented preferentially over others of the buckets according to the respective statistic of the selected bucket relative to the respective statistics of the other buckets; correcting, based on the ranking the buckets, the respective challenged stored digital rule of the selected bucket without yet correcting the respective challenged digital rule of at least one of the other buckets; receiving additional datasets from the first remote devices via a network, the additional datasets having respective dataset values; accessing the stored digital rules in response to receiving the additional datasets; identifying the corrected digital rule and the yet-uncorrected challenged digital rule for respective ones of the additional datasets responsive to at least one of the dataset values of the additional respective datasets; producing, by applying the corrected digital rule and the yet-uncorrected digital rule to the respective additional datasets, additional respective resources; and causing notifications to be transmitted via a network to the first remote devices, the notifications being about aspects of the additional respective resources.

The method may further include causing a dispute opportunity to be presented in conjunction with a certain one of the resources in a User Interface (UI) of a certain one of the second remote devices, the dispute opportunity presenting at least one challenged field for a user to make an entry, and in which one of the challenges is received as such an entry to the challenged field. In some embodiments, the certain second remote device is one of the first remote devices. The method may further include causing the certain resource to be presented in the UI. The method may further include causing a link to be presented in the UI, in which activating the link causes the dispute opportunity to be thus presented. In some embodiments, the challenged field may include a space for text explanation. In some embodiments, the dispute opportunity includes at least one aspect of a certain one of the respective challenged ones of the digital rules that was applied to produce the certain resource, and the challenged field includes the aspect of the certain challenged digital rule. The method may further include looking up a certain dataset value of a certain dataset, and in which: the certain resource is caused to thus be presented by being looked up from the certain dataset value, and the certain challenged digital rule is thus presented by being looked up from the certain dataset value. In some embodiments, the certain challenged digital rule is thus presented by being looked up from a certain dataset value of a certain dataset, and the aspect is the very applicability of the certain challenged digital rule to the certain dataset. In some embodiments, the certain challenged digital rule specifies a certain percentage rate, and the certain challenged field is for disputing the certain percentage rate. The method may further include enabling at least one of the challenges by presenting at least one of the challenged digital rules that was applied to produce a respective one of the challenged resources, in which the at least one of the challenges includes a proposed correction to the at least one of the challenged digital rules. In some embodiments, the proposed correction includes a proposed correction to a percentage rate specified by the at least one of the challenged digital rules.

In some embodiments, at least one of the challenges includes a link. In some embodiments, a first one of the challenges has been classified in a first one of the buckets, the first challenge does not include a link and contributes a first amount to a first one of the statistics that has been computed for the first bucket, a second one of the challenges has been classified in a second one of the buckets, the second challenge includes a link and contributes a second amount to a second one of the statistics that has been computed for the second bucket, and the second amount is larger than the first amount responsive to the second challenge including a link and the first challenge not including a link.

The method may further include causing a dispute opportunity to be presented in conjunction with a produced resource in a User Interface (UI) of a certain one of the second remote devices, the dispute opportunity further including a promise of a reward for a challenge regarding the produced resource, and in which a certain one of the received challenges is received from the certain second remote device, and a reward is caused to be transmitted according to the promise. The method may further include causing a request to be presented for a separate email address to use to transmit the reward; receiving the email address in response to the request; and causing the reward to be transmitted using the email address. The method may further include checking whether the condition is met, in which the reward is caused to be transmitted responsive to the condition being met. In some embodiments, the condition includes that the certain challenge must be among a first N challenges to be received for the challenged resource, where N is a selected number, and in which the method may further include ranking, within a bucket into which the certain challenge is classified, challenges classified into the bucket by when the challenges classified into the bucket were received, and causing the reward to be transmitted in response to, and only if, the certain challenge is among a first N challenges to be received for the challenged resource based on the ranking within the bucket.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system including at least:
one or more processors; and
a non-transitory computer-readable storage medium having stored thereon instructions which, when executed by the one or more processors, result in operations including at least:
receiving, via a network with first and second remote devices, from the second remote devices, challenges responsive to at least some notifications regarding aspects of resources, the challenges disputing challenged ones of the resources;
classifying the challenges into buckets according to respective challenged ones of stored digital rules that were applied to produce the respective ones of the challenged resources, in which a bucket is something that groups objects together;
computing respective statistics for the buckets;
ranking the buckets by at least causing a selected one of the buckets to be presented preferentially over others of the buckets according to the respective statistic of the selected bucket relative to the respective statistics of the other buckets;
correcting, based on the ranking the buckets, the respective challenged stored digital rule of the selected bucket without yet correcting the respective challenged digital rule of at least one of the other buckets;
receiving additional datasets from the first remote devices via the network, the additional datasets having respective dataset values;
accessing the stored digital rules in response to receiving the additional datasets;
identifying the corrected digital rule and the yet-uncorrected challenged digital rule for respective ones of the additional datasets responsive to at least one of the dataset values of the additional respective datasets;
producing, by applying the corrected digital rule and the yet-uncorrected digital rule to the respective additional datasets, additional respective resources; and
causing notifications to be transmitted via the network to the first remote devices, the notifications being about aspects of the additional respective resources.

2. The computer system of claim 1 in which the instructions, when executed by the one or more processors, further result in operations including:
causing a dispute opportunity to be presented in conjunction with a certain one of the resources in a User Interface (UI) of a certain one of the second remote devices, the dispute opportunity presenting at least one challenged field for a user to make an entry, and
in which one of the challenges is received as such an entry to the challenged field.

3. The computer system of claim 2 in which the certain second remote device is one of the first remote devices.

4. The computer system of claim 2 in which the instructions, when executed by the one or more processors, further result in operations including:
causing the certain resource to be presented in the UI.

5. The computer system of claim 2 in which the instructions, when executed by the one or more processors, further result in operations including:
causing a link to be presented in the UI, in which activating the link causes the dispute opportunity to be thus presented.

6. The computer system of claim 2 in which the challenged field includes a space for text explanation.

7. The computer system of claim 2 in which:
the dispute opportunity includes at least one aspect of a certain one of the respective challenged ones of the digital rules that was applied to produce the certain resource, and
the challenged field includes the aspect of the certain challenged digital rule.

8. The computer system of claim 7 in which the instructions, when executed by the one or more processors, further result in operations including:
looking up a certain dataset value of a certain dataset, and
in which:
the certain resource is caused to thus be presented by being looked up from the certain dataset value, and
the certain challenged digital rule is thus presented by being looked up from the certain dataset value.

9. The computer system of claim 7 in which:
the certain challenged digital rule is thus presented by being looked up from a certain dataset value of a certain dataset, and
the aspect is the very applicability of the certain challenged digital rule to the certain dataset.

10. The computer system of claim 7 in which:
the certain challenged digital rule specifies a certain percentage rate, and
the certain challenged field is for disputing the certain percentage rate.

11. The computer system of claim 1 in which the instructions, when executed by the one or more processors, further result in operations including:
enabling at least one of the challenges by presenting at least one of the challenged digital rules that was applied to produce a respective one of the challenged resources, in which the at least one of the challenges includes a proposed correction to the at least one of the challenged digital rules.

12. The computer system of claim 11 in which the proposed correction includes a proposed correction to a percentage rate specified by the at least one of the challenged digital rules.

13. The computer system of claim 1 in which at least one of the challenges includes a link.

14. The computer system of claim 1 in which:
a first one of the challenges has been classified in a first one of the buckets,
the first challenge does not include a link and contributes a first amount to a first one of the statistics that has been computed for the first bucket,
a second one of the challenges has been classified in a second one of the buckets,
the second challenge includes a link and contributes a second amount to a second one of the statistics that has been computed for the second bucket, and
the second amount is larger than the first amount responsive to the second challenge including a link and the first challenge not including a link.

15. The computer system of claim 1 in which the instructions, when executed by the one or more processors, further result in operations including:
causing a dispute opportunity to be presented in conjunction with a produced resource in a User Interface (UI) of a certain one of the second remote devices, the dispute opportunity further including a promise of a reward for a challenge regarding the produced resource, and
in which a certain one of the received challenges is received from the certain second remote device, and a reward is caused to be transmitted according to the promise.

16. The computer system of claim 15 in which the instructions, when executed by the one or more processors, further result in operations including:
causing a request to be presented for a separate email address to use to transmit the reward;
receiving the email address in response to the request; and
causing the reward to be transmitted using the email address.

17. The computer system of claim 15 in which the promise includes a condition and the instructions, when executed by the one or more processors, further result in operations including:
checking whether the condition is met, in which the reward is caused to be transmitted responsive to the condition being met.

18. The computer system of claim 17 in which the condition includes that the certain challenge must be among a first N challenges to be received for the challenged resource, where N is a selected number, and in which the instructions, when executed by the one or more processors, further result in operations including:
ranking, within a bucket into which the certain challenge is classified, challenges classified into the bucket by when the challenges classified into the bucket were received, and
causing the reward to be transmitted in response to, and only if, the certain challenge is among a first N challenges to be received for the challenged resource based on the ranking within the bucket.

* * * * *